(12) United States Patent
Martin et al.

(10) Patent No.: US 10,684,781 B1
(45) Date of Patent: Jun. 16, 2020

(54) BIG DATA READ-WRITE REDUCTION

(71) Applicant: The MathWorks, Inc., Natick, MA (US)

(72) Inventors: Jocelyn Luke Martin, Burwell (GB); Penelope L. Anderson, Newton, MA (US); Richard Amos, Cambridgeshire (GB); Edric Mark Ellis, Cambridgeshire (GB); Benjamin Tordoff, Whittlesey (GB); Danil Kirsanov, Cambridge, MA (US); Wei Wang, Watertown, MA (US); Thomas P. Lane, Carlisle, MA (US); Aaron J. Powers, Wayland, MA (US); Lucio Andrade-Cetto, Natick, MA (US); Michael A. Procopio, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 222 days.

(21) Appl. No.: 15/216,493

(22) Filed: Jul. 21, 2016

Related U.S. Application Data

(60) Provisional application No. 62/387,169, filed on Dec. 23, 2015, provisional application No. 62/387,167, filed on Dec. 23, 2015.

(51) Int. Cl.
*G06F 3/06* (2006.01)
*G06F 8/34* (2018.01)
*G06F 8/35* (2018.01)

(52) U.S. Cl.
CPC .......... *G06F 3/0619* (2013.01); *G06F 3/0644* (2013.01); *G06F 3/0665* (2013.01);
(Continued)

(58) Field of Classification Search
None
See application file for complete search history.

(56) References Cited

U.S. PATENT DOCUMENTS

| | | | | |
|---|---|---|---|---|
| 2014/0032527 | A1* | 1/2014 | Chambers | G06F 9/3885 707/717 |
| 2015/0373105 | A1* | 12/2015 | Okada | H04L 67/1095 709/219 |
| 2016/0321310 | A1* | 11/2016 | Alshammari | G06F 17/30345 |

OTHER PUBLICATIONS

Wikipedia, "Apache Spark," https://en.wikipedia.org/wiki/Apache_Spark, Jul. 15, 2016, 5 pages.

(Continued)

*Primary Examiner* — Masud K Khan
(74) *Attorney, Agent, or Firm* — Wolf, Greenfield & Sacks, P.C.

(57) ABSTRACT

A device may include one or more processors. The device may receive program code that identifies operations to be performed with regard to a data set to determine an output value. The device may identify a plurality of read operations corresponding to the operations. The plurality of read operations may be performed to obtain respective inputs of the operations. The device may generate a first data structure that identifies the operations and the plurality of read operations. The device may identify two or more operations, of the operations, that receive a particular input. The device may generate a second data structure that includes a combined operation. The combined operation may be generated based on the two or more operations, and may be associated with fewer read operations than the two or more operations. The device may determine the output value based on the second data structure.

20 Claims, 19 Drawing Sheets

(52) U.S. Cl.
CPC .............. *G06F 3/0689* (2013.01); *G06F 8/34* (2013.01); *G06F 8/35* (2013.01)

(56) References Cited

OTHER PUBLICATIONS

Cheung et al., Sloth: Being Lazy is a Virtue (When Issuing Database Queries). ACM Transactions Database Systems. Jun. 30, 2016;41(2):8.

\* cited by examiner

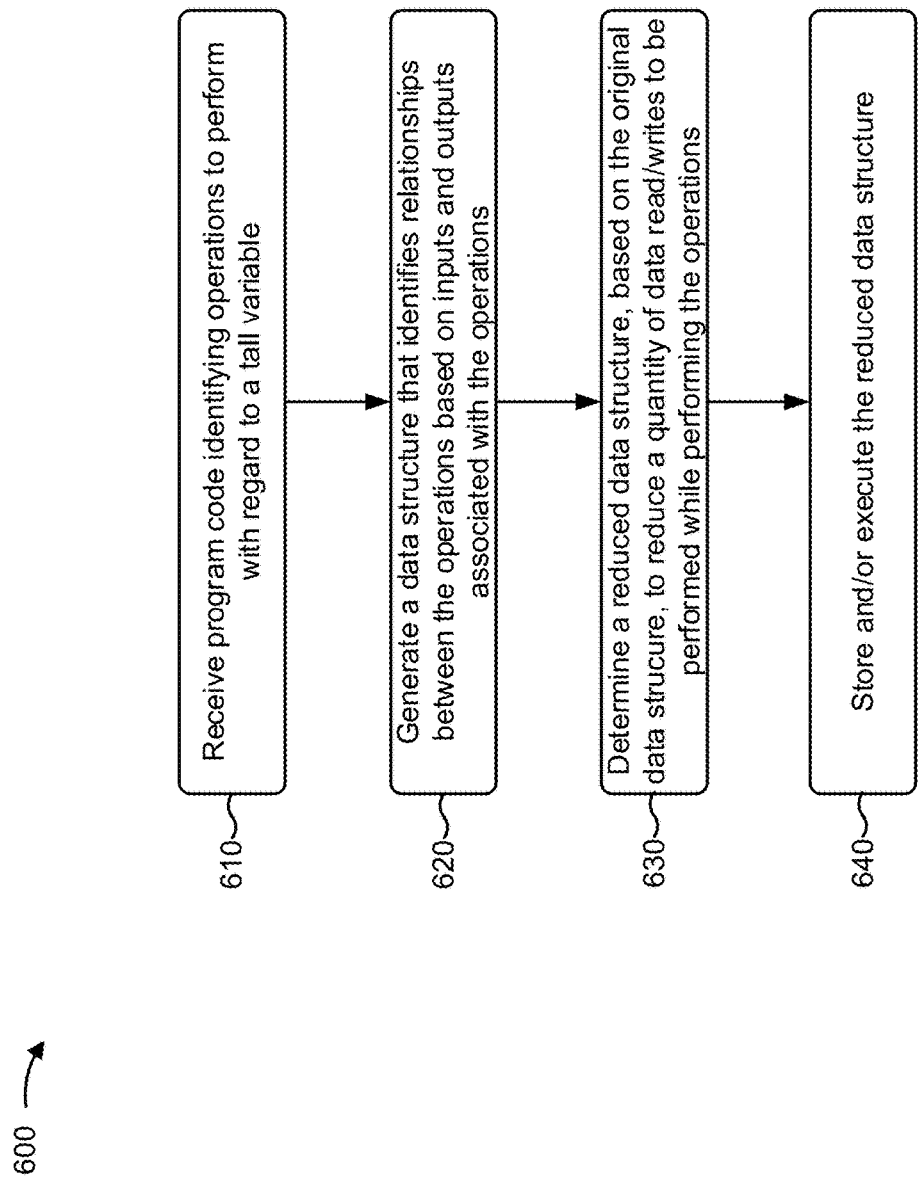

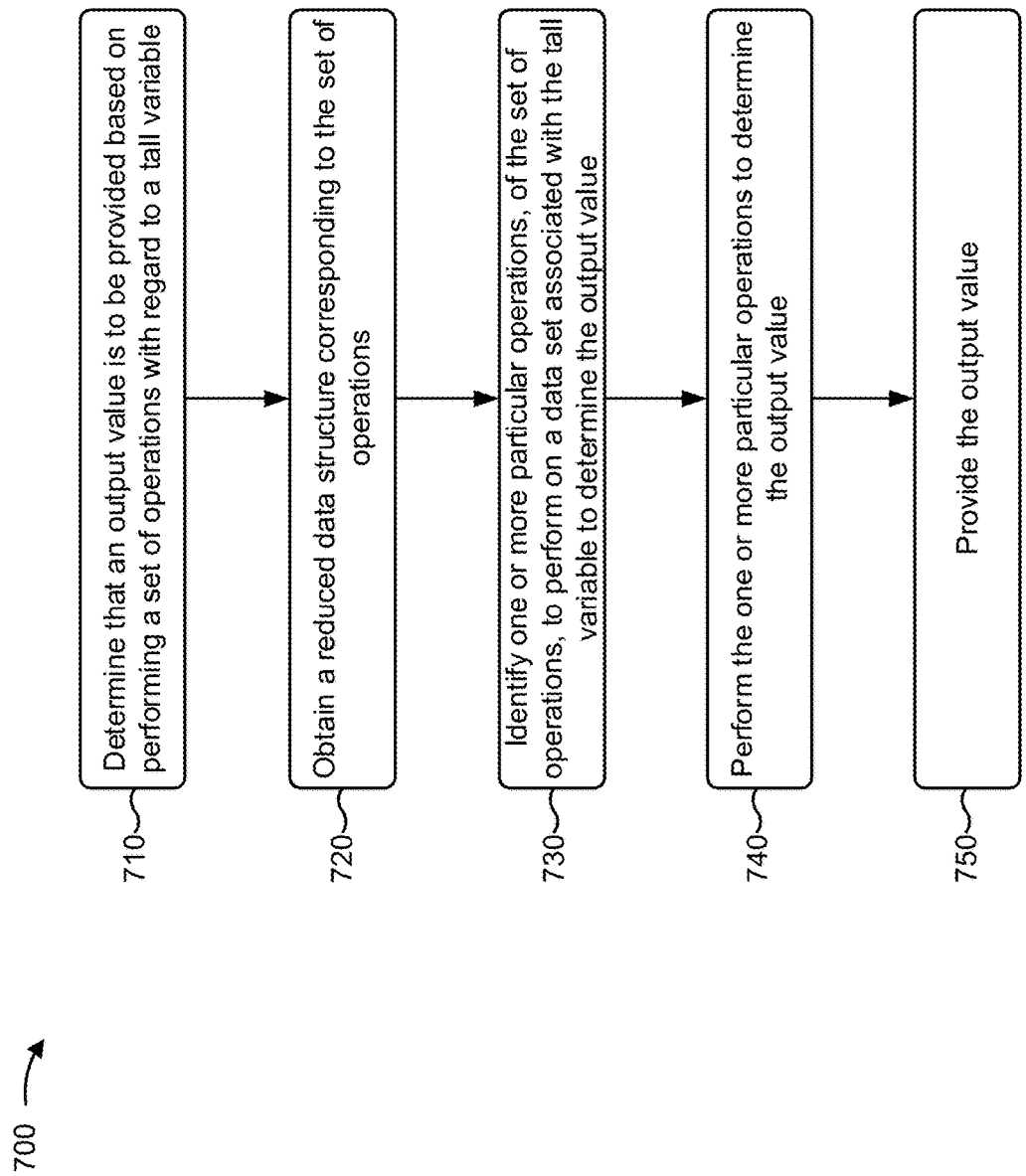

BIG DATA READ-WRITE REDUCTION

RELATED APPLICATIONS

This application claims priority under 35 U.S.C. § 119 to U.S. Provisional Patent Application No. 62/387,167, filed on Dec. 23, 2015, and to U.S. Provisional Patent Application No. 62/387,169, filed on Dec. 23, 2015, the content of which is incorporated by reference herein in its entirety.

BRIEF DESCRIPTION OF THE DRAWINGS

FIG. 6 is a flow chart of an example process for reducing read-write operations when processing big data; and FIG. 7 is a flow chart of an example process for processing big data based on a reduced data structure.

DETAILED DESCRIPTION

Figure 1A:
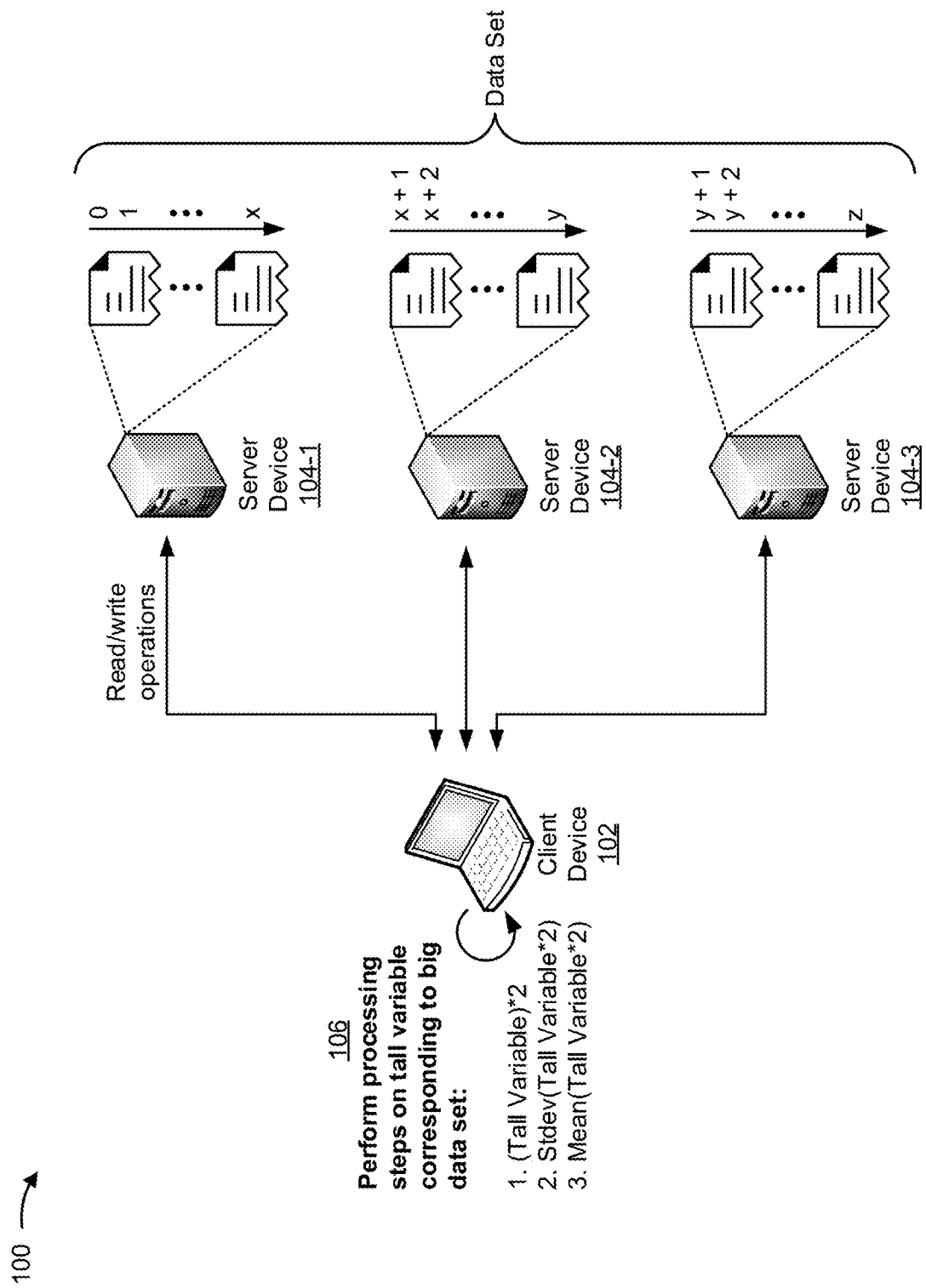
FIGS. 1A-1D are diagrams of an overview of an example implementation described herein.

The following detailed description of example implementations refers to the accompanying drawings. The same reference numbers in different drawings may identify the same or similar elements.

"Big data" may refer to data that is difficult to process using traditional programs and/or data structures. For example, a batch of big data may be too large to fit in local memory (e.g., random-access memory (RAM), local disk space, disk space on any one device, a cache of a device, etc.). In some cases, a batch of big data may be spread across multiple devices, servers, or the like, and/or may include a large quantity of data (e.g., hundreds of gigabytes, terabytes, petabytes, an unidentified quantity of data, etc.).

Performing processing operations on big data may be time-consuming when the processing operations require many read-write operations (i.e., disk access operations) to be performed. For example, in a situation where a program performs a first operation with regard to a set of big data, then later performs a second operation with regard to the set of big data, some technical computing environments or devices may perform a first read and a first write (e.g., a first read disk access operation and a first write disk access operation) with regard to the first operation, and then may perform a second read and a second write with regard to the second operation. This may be time-consuming and disk-intensive for large batches of big data. Furthermore, a user (e.g., a computer programmer, etc.) may need to write different algorithms to process different batches of big data (e.g., based on different formats of the batches, different locations of the batches, etc.), which is time and resource intensive.

Implementations described herein enable a device to facilitate processing of big data using tall variables, partitioned arrays, and big data primitive data types that are configured to interact with big data. A tall variable, as described herein, may refer to a variable that is associated with an array that extends beyond local memory or has an unidentified length in a particular dimension, referred to herein as a "tall" dimension of the array. In other words, a tall variable is "tall" based on a corresponding array having one "big" dimension that extends beyond local memory or has an unidentified length. A tall variable may be associated with a partitioned array. The partitioned array associated with a tall variable may store information that describes how to access data associated with the tall variable (e.g., locations of the data, one or more backend environment operations to perform to obtain the data, which dimension of the big data extends beyond local memory and/or for an unidentified quantity of values, etc.). Further, the partitioned array may store information that identifies operations that can be performed with regard to the tall variable (e.g., specific function handles that the partitioned array can handle, specific big data primitives that the partitioned array can handle, rules that the partitioned array may follow, etc.). Still further, the partitioned array may store a data structure (e.g., an abstract syntax tree, etc.) that is generated based on information inputted with regard to the partitioned array. Big data primitives may refer to programming language primitives that correspond to operations relating to big data (e.g., aggregation functions, cache functions, reduction functions, re-partition functions, etc.). Big data primitives are described in more detail elsewhere herein.

As an example, a device may receive information that identifies a set of operations (e.g., function handles, big data primitives, etc.) to be performed with regard to a data set of big data that is associated with a tall variable. The partitioned array may store a data structure (e.g., a data structure generated based on the set of operations) that identifies the set of operations, inputs received by the set of operations, outputs provided by the set of operations, or the like. For example, if a first operation outputs a value that is used as an input by a second operation, the data structure may identify a relationship between the first operation and the second operation. In some implementations, the data structure may identify relationships between operations based on closures corresponding to the operations. A closure may identify an operation, one or more inputs to the operation, and one or more outputs of the operation.

When the device determines that a requested value of a variable cannot be obtained without performing the set of operations, or when the device receives an instruction to obtain the requested value, the device may attempt to reduce a quantity of read-write operations (e.g., disk access operations) required to determine the requested value, and may perform the set of operations as reduced. For example, the device may combine operations that can be performed based on a single read operation, may identify operations that can be performed in parallel, or the like.

By generating and storing the data structures, the device facilitates improvement of run-time performance by reducing a quantity of read and/or write operations performed with regard to a batch of big data. In this way, the device improves performance and reduces time required to perform operations on big data, thereby conserving computer resources. Furthermore, by using partitioned arrays and big data primitives, the device permits a user to input operations that can function across different big data formats and/or locations, thus conserving computer resources and reducing waste associated with configuring different programs for different big data batches. Still further, by using big data primitives, implementations described herein permit a user to generate program code for different big data backend environments without learning syntax unique to the different big data backend environments.

FIGS. 1A-1D are diagrams of an overview of an example implementation 100 described herein. As shown in FIG. 1A, a client device 102 may receive instructions that identify processing operations to perform with regard to a tall variable corresponding to a data set of big data. A tall variable may be associated with a tall dimension and one or more non-tall dimensions. As described herein, a tall dimension of an array is a dimension that stores an unidentified quantity of values and/or that extends beyond local memory of client device 102. For example, a four-row array that extends for an unidentified quantity of columns has a non-tall dimension with a size of 4, corresponding to the four rows, and a tall dimension that extends for an unidentified quantity of columns along the four rows. In some cases, a tall array may extend beyond local memory of client device 102. For example, if an array identifying email messages is distributed across multiple server devices 104, a tall variable relating to indexing the email messages may have a tall dimension corresponding to index values assigned to the email messages.

A tall variable may include elements. An element may include a scalar value that represents a data point in the tall variable. For example, when a tall variable is associated with a data set of numerical values, each numerical value may be an element of the tall variable. As another example, when a tall variable is associated with an array of strings, each string, of the array of strings, may be a different element of the tall variable. An example of an element is shown and described in connection with FIG. 1B, below.

As further shown, the data set corresponding to the tall variable may be stored by server devices 104-1 through 104-3. For example, server device 104-1 stores a first portion of the data set corresponding to index values 0 through x, server device 104-2 stores a second portion of the data set corresponding to index values x+1 through y, and server device 104-3 stores a third portion of the data set corresponding to index values y+1 through z. In some implementations, the index values of x, y, and/or z may not be known by client device 102. For example, the data set may include an unidentified quantity of columns and/or one or more of the server devices 104 may store an unidentified quantity of elements of the data set. The portions of the data set stored by server devices 104-1 through 104-3 may be referred to as partitions, and are described in more detail in connection with FIG. 1B, below.

As shown by reference number 106, the processing operations include multiplying each element of the tall variable by a scalar value (e.g., 2), determining a standard deviation of the tall variable, and determining a mean of the tall variable. To perform a processing operation, client device 102 may read each element of the data set corresponding to the tall variable, may perform the processing operation with regard to each element, and may output processed data (e.g., for a write operation, for display, etc.). However, performing a different read operation for each processing operation, of a set of processing operations, may be time-consuming and resource-intensive for client device 102 and/or server device 104.

Figure 1B:
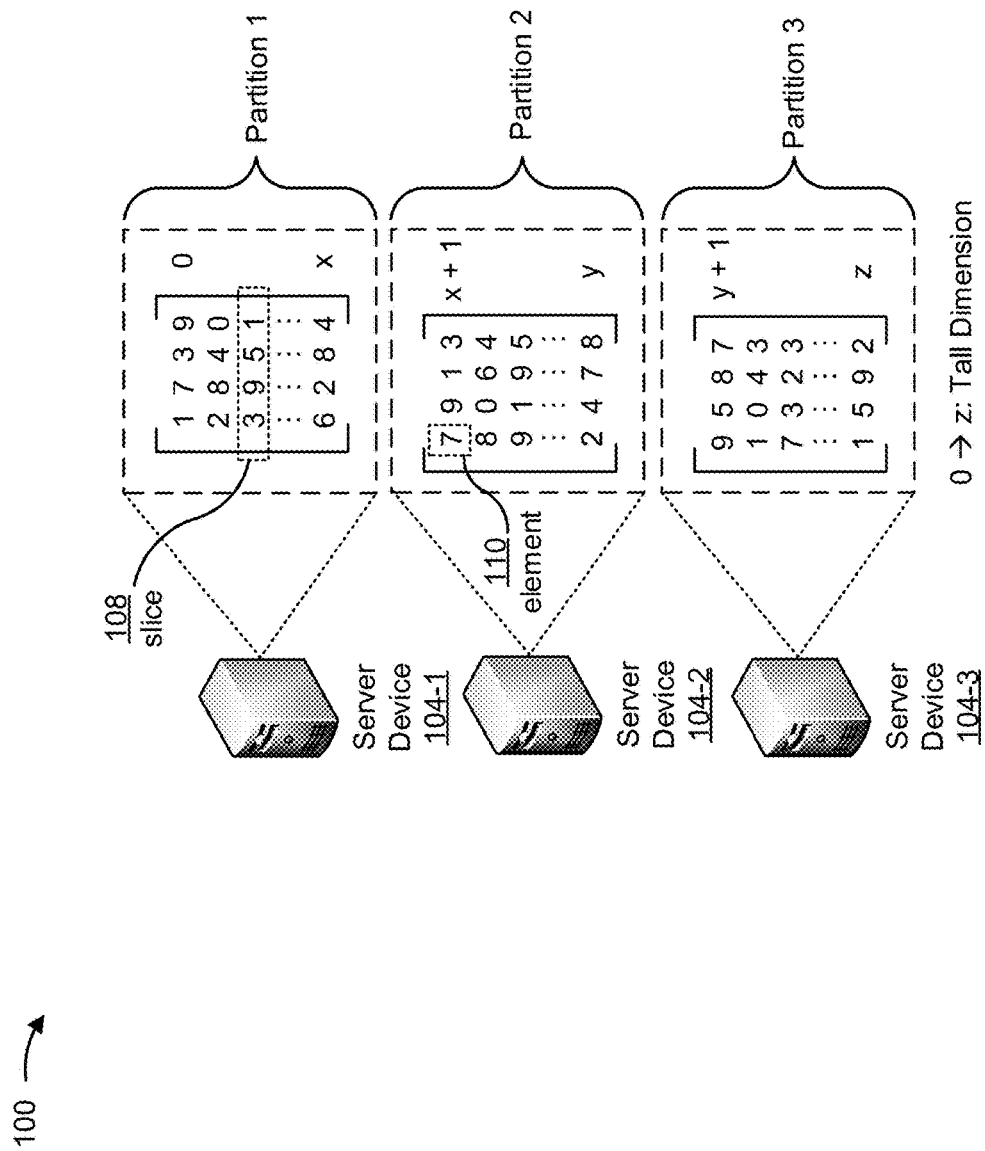

FIG. 1B shows an example implementation of the tall variable described in connection with FIG. 1A. As shown, the tall variable may include partitions. A tall array that includes multiple partitions may be referred to herein as a partitioned array. As described herein, a partition is an array, or a portion of a data set, that may be processed by a single context, or may be processed by a single task. A context may refer to a deployment of a technical computing environment (e.g., a TCE, such as TCE 220 described below) that is associated with data needed to perform processing operations relating to a partition of a tall variable. In other words, a context may include a compiler runtime, a virtual machine, a backend task, or the like, and may be associated with data, libraries, or the like, to be used to perform processing of one or more partitions. A context may be implemented or managed by a big data backend environment associated with the TCE. For example, the big data backend environment may obtain input data to be processed by the context, may provide the input data to a device that hosts the context and/or the processing operation, and may obtain output data from the device that hosts the context and/or processing operation.

As shown, each partition may be stored by a corresponding server device 104. Additionally, or alternatively, a partition may be stored by multiple, different devices. For example, a first portion of a partition may be stored by a first device and a second portion of the partition may be stored by a second device. In some implementations, a context associated with (e.g., executed by) server device 104-1 may perform processing operations with regard to Partition 1, a context associated with (e.g., executed by) server device 104-2 may perform processing operations with regard to Partition 2, and a context associated with (e.g., executed by) server device 104-3 may perform processing operations with regard to Partition 3. Additionally, or alternatively, server devices 104 may provide the corresponding partitions to client device 102, and client device 102 may perform the processing operations.

When processing multiple partitions of a tall variable, each partition, of the multiple partitions, may be processed by a corresponding context (e.g., in parallel), as described in more detail in connection with FIGS. 5A and 5B, below. Additionally, or alternatively, two or more partitions may be processed by the same context (e.g., in sequence). In some implementations, a context that processes a particular partition may be executed on the same device that stores the particular partition, which improves performance of the context and reduces data transfer between different devices. Additionally, or alternatively, client device 102 may cause a partition to be provided from a first device that stores the partition to a second device that hosts a context, and the context may perform an operation on the partition. In this way, client device 102 may conserve processor resources of the first device.

In some implementations, when a partition is distributed across multiple, different devices, client device 102 may select a selected device of the multiple, different devices. Client device 102 may cause a context that processes the partition to be executed on the selected device, which may improve efficiency of the context and reduce data transfer between devices.

As shown, the tall dimension of the tall variable may extend from index value 0 to index value z. As further shown, the tall variable includes four rows. Thus, the tall variable may be said to have a size, in a non-tall dimension, of 4.

In some implementations, an operation may relate to a slice of a tall variable. As shown by reference number 108, a slice may include each value corresponding to a particular index value in the tall dimension. For example, the tall variable shown in FIG. 1B includes 4 rows and an unidentified quantity of columns, and a slice of the tall variable includes a value from each of the 4 rows corresponding to an index value of a particular column. In some implementations, a slice may be guaranteed to fit within local memory of a device on which a context relating to the slice is executed (e.g., client device 102 and/or server device 104). As shown by reference number 110, the tall variable may include elements. As shown, each element of the tall variable is an integer value.

Figure 1C:
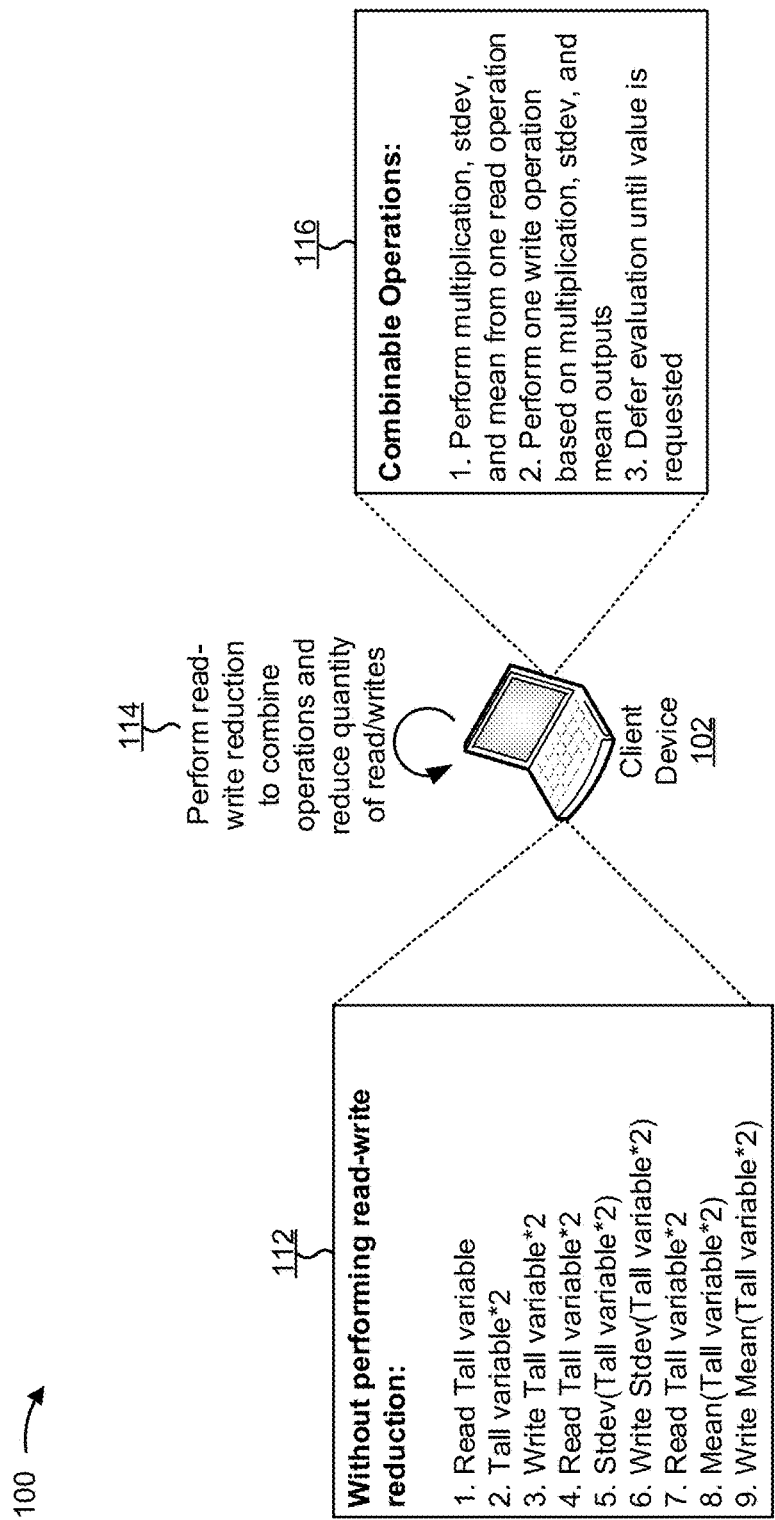

As shown in FIG. 1C, and by reference number 112, in some cases, client device 102 may perform the processing operations without performing read-write reduction to reduce a quantity of read operations and/or write operations performed by client device 102 and/or server device 104. In such a case, client device 102 may perform a read operation corresponding to each processing operation (e.g., steps 1, 4, and 7), may perform each processing operation (e.g., steps 2, 5, and 8), and may perform a write operation corresponding to each processing operation (e.g., steps 3, 6, and 9). This may be time consuming and resource-intensive for client device 102 and/or server devices 104.

As shown by reference number 114, client device 102 may perform read-write reduction to combine processing operations and to reduce a quantity of read and/or write operations to be performed with regard to the processing operations. To perform read-write reduction, client device 102 may generate a data structure (e.g., a directed graph, a tree, an abstract syntax tree, etc.), and may identify sets of processing operations that can be performed based on a single read operation and/or a single write operation. The data structure may identify one or more read operations to obtain the data set, may identify operations to perform on the data set based on the program code, and may identify one or more write operations to cause information relating to the operations and/or the data set to be stored. For a more detailed description of data structures, such as abstract syntax trees, refer to FIGS. 4A-4I, below.

A data structure may identify an operation, an input of the operation, and an output of the operation. The data structure may identify a hierarchical relationship between operations identified by program code. For example, assume that a first operation provides a particular value as an output, and assume that a second operation receives the particular value as an input. In that case, the data structure may include a first node corresponding to the first operation and a second node corresponding to the second operation. The first operation may be connected with the second operation in the data structure, and the data structure may identify the particular value as an output of the first operation and an input of the second operation.

In some implementations, the data structure may identify an operation type. The operation type may include, for example, a read operation type, a write operation type, an aggregation operation type, a reduction operation type, a slice-wise operation type, an element-wise operation type, a filter operation type, a partition-wise operation type, an aggregation-by-key operation type, a cache operation type, or another operation type, as described in more detail in connection with FIGS. 4A-4I and 6, below.

Based on the hierarchical relationships and operation types of the processing operations, client device 102 may generate a reduced data structure. Client device 102 may generate the reduced data structure to reduce a quantity of read operations and/or write operations performed with regard to the data set. For example, in some cases, a set of operations may be combined based on the set of operations receiving the same input data. As another example, a set of operations of a particular operation type may be combined based on the set of operations receiving the same input data, or based on a single processing pass through the input data. Client device 102 may cause each operation, of the set of operations, to be performed based on a single read operation. In this way, client device 102 reduces a quantity of read operations to be performed with regard to the data set.

As shown by reference number 116, based on the reduced data structure, client device 102 may determine that the multiplication, standard deviation, and mean processing operations can be performed based on a single read operation, thereby improving processing speed and conserving resources of client device 102 and/or server devices 104. As further shown, client device 102 may determine that results of the multiplication, standard deviation, and mean processing operations can be outputted based on a single write operation. As further shown, client device 102 may determine that evaluation of the results of the multiplication, standard deviation, and mean processing operations is to be deferred until a value of the results is requested.

Figure 1D:
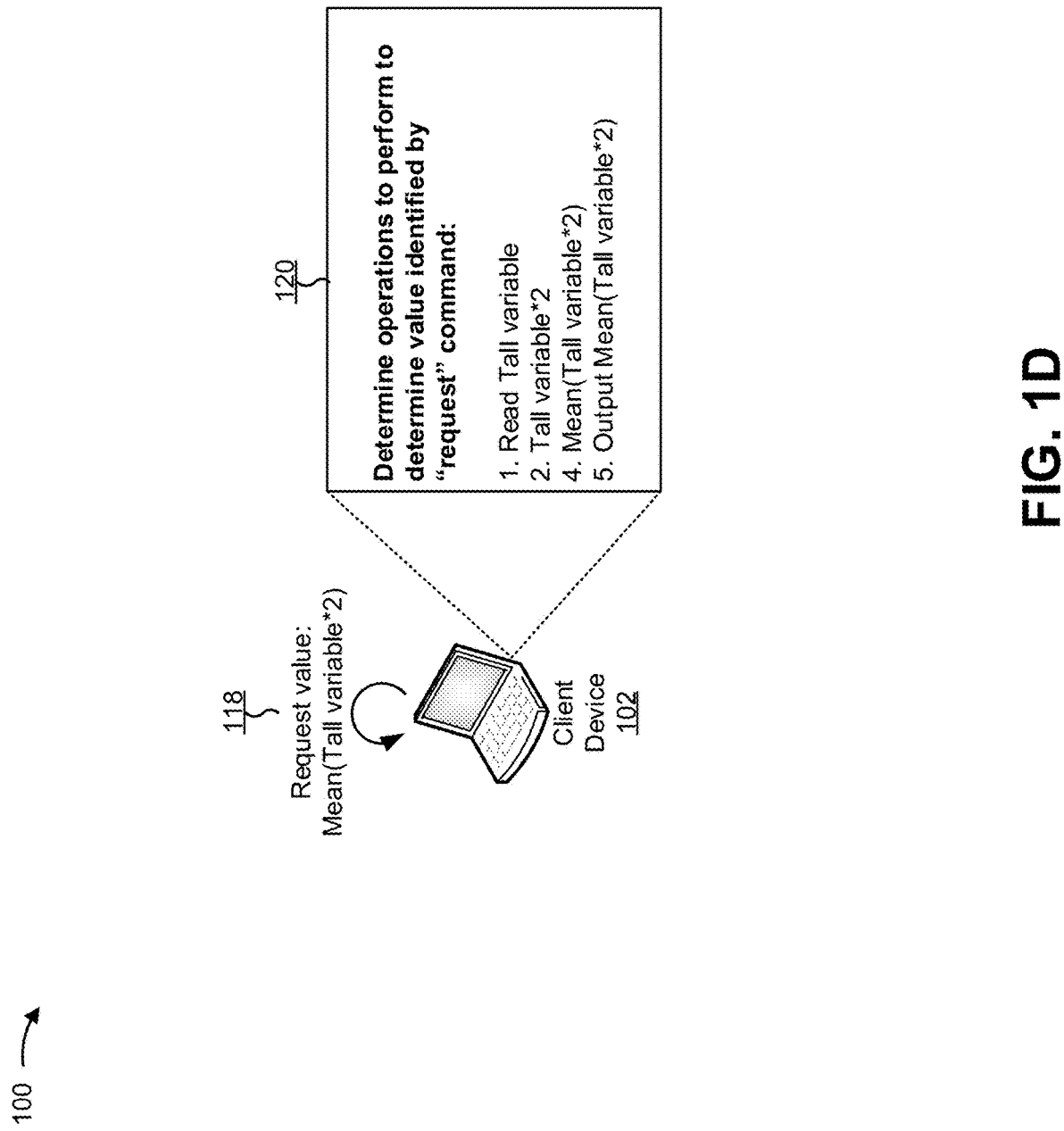

As shown in FIG. 1D, and by reference number 118, client device 102 may receive a request for a result of performing the processing operations (e.g., Request value: Mean(Tall variable*2)). As shown by reference number 120, client device 102 may determine operations to perform to determine the value identified by the "request" command. To determine the operations to perform, client device 102 may obtain the reduced data structure corresponding to the tall variable, and may determine which operations, of the operations identified by the reduced data structure, are to be performed to determine the result. Here, client device 102 may determine that the multiplication operation and the mean operation are to be performed to determine the result.

Client device 102 may perform the operations to determine the result, and may provide the result (e.g., for storage, to a user of client device 102, etc.). For example, client device 210 may generate processing modules, based on the reduced data structure, to perform the processing operations with regard to the partitions. In some implementations, client device 102 may generate a processing module corresponding to each partition and corresponding to each operation to be performed. For example, client device 102 may generate three processing modules to perform read operations with regard to the three partitions, may generate another three processing modules to perform the multiplication operations with regard to the respective partitions, and so on. By generating processing modules to independently perform processing operations, client device 102 may enable parallelization of execution and, thus, improve efficiency of execution of the program code. Processing modules are described in more detail in connection with FIGS. 5A and 5B, below.

In this way, client device 102 reduces an amount of time and a quantity of read-write operations required to perform operations on big data, which conserves computer resources used to perform the operations.

As indicated above, FIGS. 1A-1D are provided merely as examples. Other examples are possible, and may differ from what was described with regard to FIGS. 1A-1D.

Figure 2:
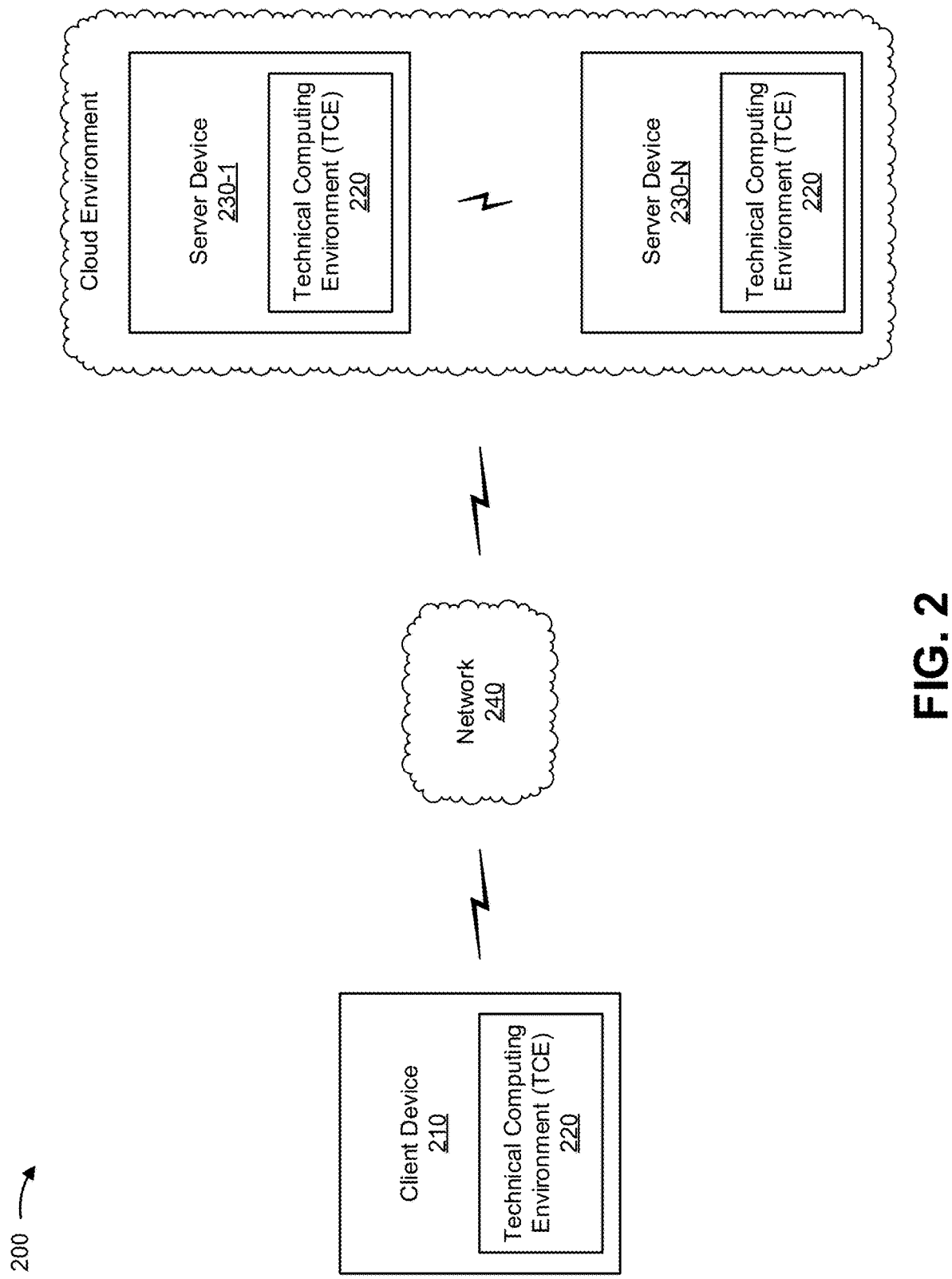
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include one or more server devices 230-1 through 230-N (N≥1) (hereinafter referred to collectively as "server devices 230," and individually as "server device 230), and a network 240. Server device 230 may include TCE 220. Devices of environment 200 may interconnect via wired connections, wireless connections, or a combination of wired and wireless connections.

Client device 210 includes one or more devices capable of receiving, generating, storing, processing, and/or providing program code and/or information associated with program code. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 220 may include a user interface for providing information to a user and/or receiving information from the user (e.g., program code, diagnostic messages, user interactions, etc.).

Server device 230 includes one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In this way, front-end applications (e.g., a user interface) may be separated from back-end applications (e.g., program code execution). Additionally, or alternatively, server device 230 may perform one, more, or all operations described elsewhere herein as being performed by client device 210.

As shown, in some implementations, server device 230 may include one or more devices operating in a cloud computing environment. For example, server device 230 may be associated with a cloud data storage service, a cluster computing environment, or the like. In such a case, a batch of data may be distributed among and/or processed by multiple server devices 230. Additionally, or alternatively, portions of a batch of data may be distributed among and/or processed by multiple server devices 230. Additionally, or alternatively, a batch of data may be distributed among and/or processed by multiple, different logical pools of a particular server device 230.

Network 240 includes one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
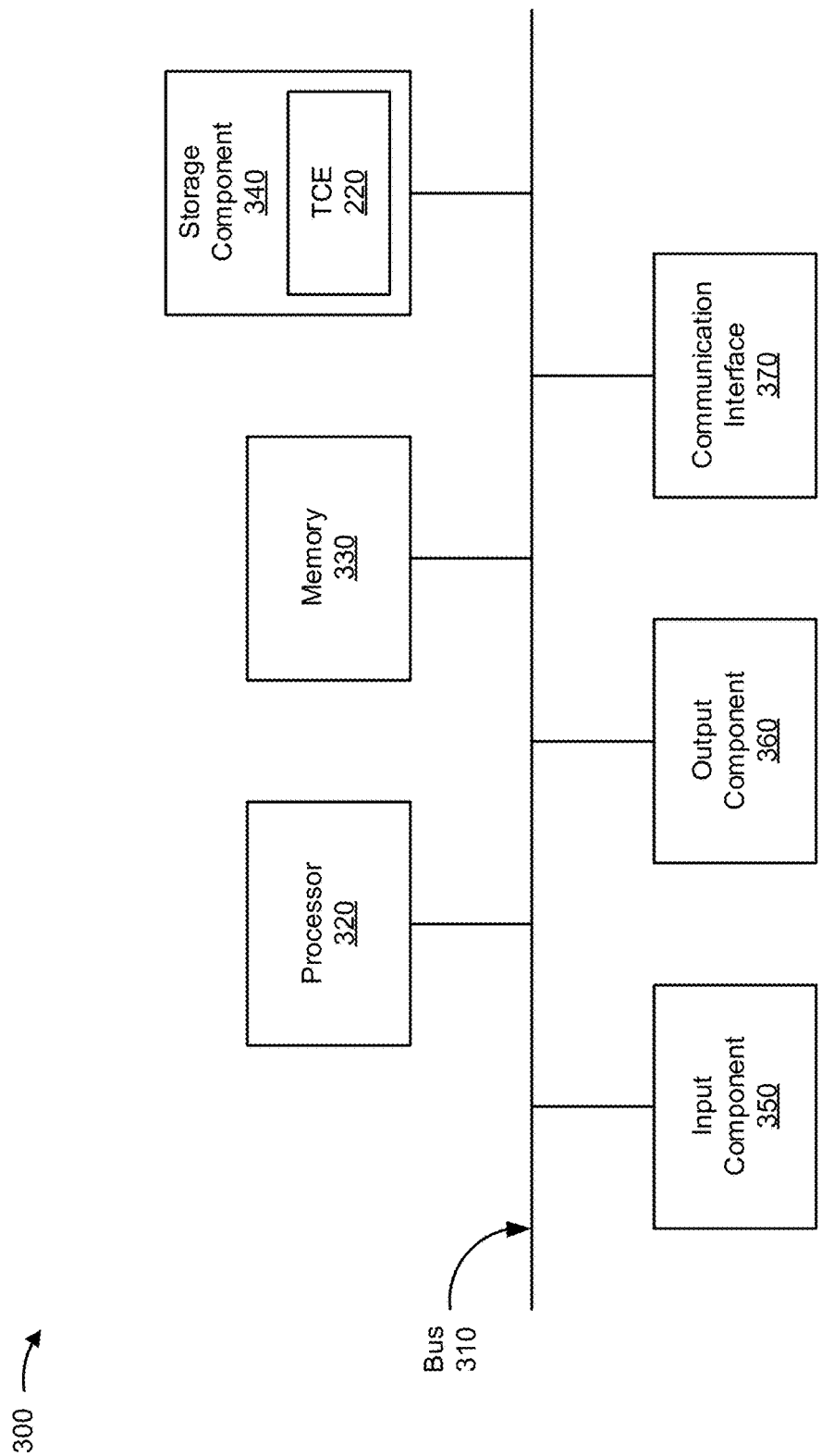
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4I are diagrams of an example implementation 400 of generating and modifying a data structure to reduce read/write operations when processing big data. In the examples shown in FIGS. 4A-4I, the programming environment is TCE 220 executing on a device (e.g., client device 210 or server device 230).

Figure 4A:
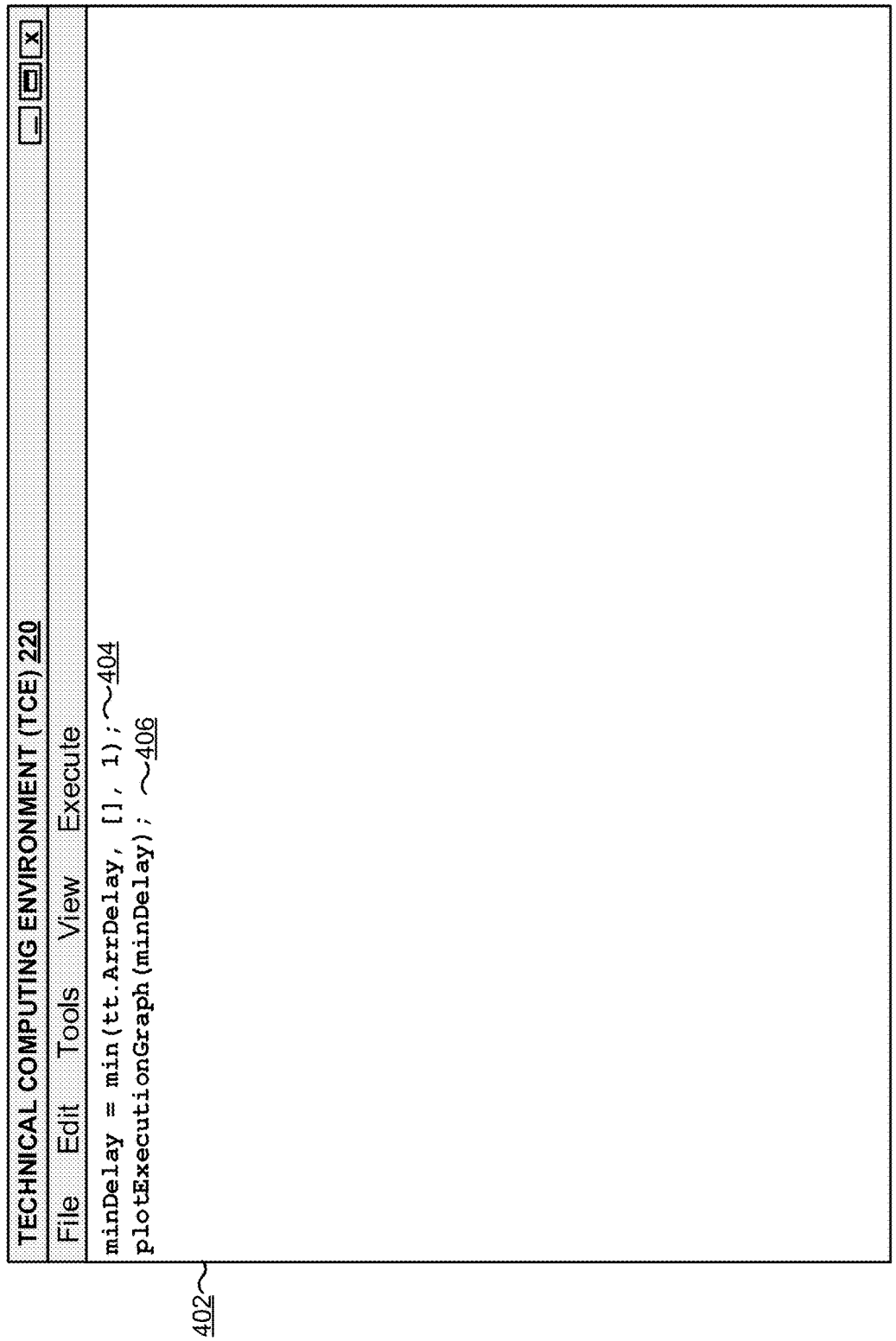
FIGS. 4A-4I are diagrams of an example implementation of generating and modifying a data structure to reduce read/write operations when processing big data.

As shown in FIG. 4A, client device 210 (e.g., TCE 220) may receive program code. For example, a user (e.g., a computer programmer) may input program code via a code editor window 402 of TCE 220. The program code may identify operations to perform with regard to a tall variable of tt.ArrDelay. As shown by reference number 404, the program code may include a first operation of minDelay=min(tt.ArrDelay, [ ], 1) to determine a minimum value of tt.ArrDelay. To execute the min operation, client device 210 may read each element of tt.ArrDelay, and may determine a minimum value of the elements of tt.ArrDelay.

The first operation is a reduction operation. A reduction operation may receive, as input, at least one input array (e.g., a tall array or a non-tall array) and outputs an output array of a predetermined size (i.e., a non-tall output array) or a single value. For example, an operation that outputs information identifying a sum of each value of an input array is a reduction operation. As another example, an operation that outputs information identifying a mean of each value of an input array is a reduction function. As yet another example, an operation that outputs a size of an array is a reduction function. When a reduction operation receives two or more input arrays, client device 210 may determine whether sizes of the input arrays match in the tall dimension. When the sizes do not match, client device 210 may generate an error, may modify one or more of the input arrays to cause the sizes to match, or the like.

As shown by reference number 406, the program code may include a second operation (e.g., plotExecutionGraph (minDelay);) to cause client device 210 to provide, for display, a graphical representation of a data structure corresponding to tt.ArrDelay.

Figure 4B:
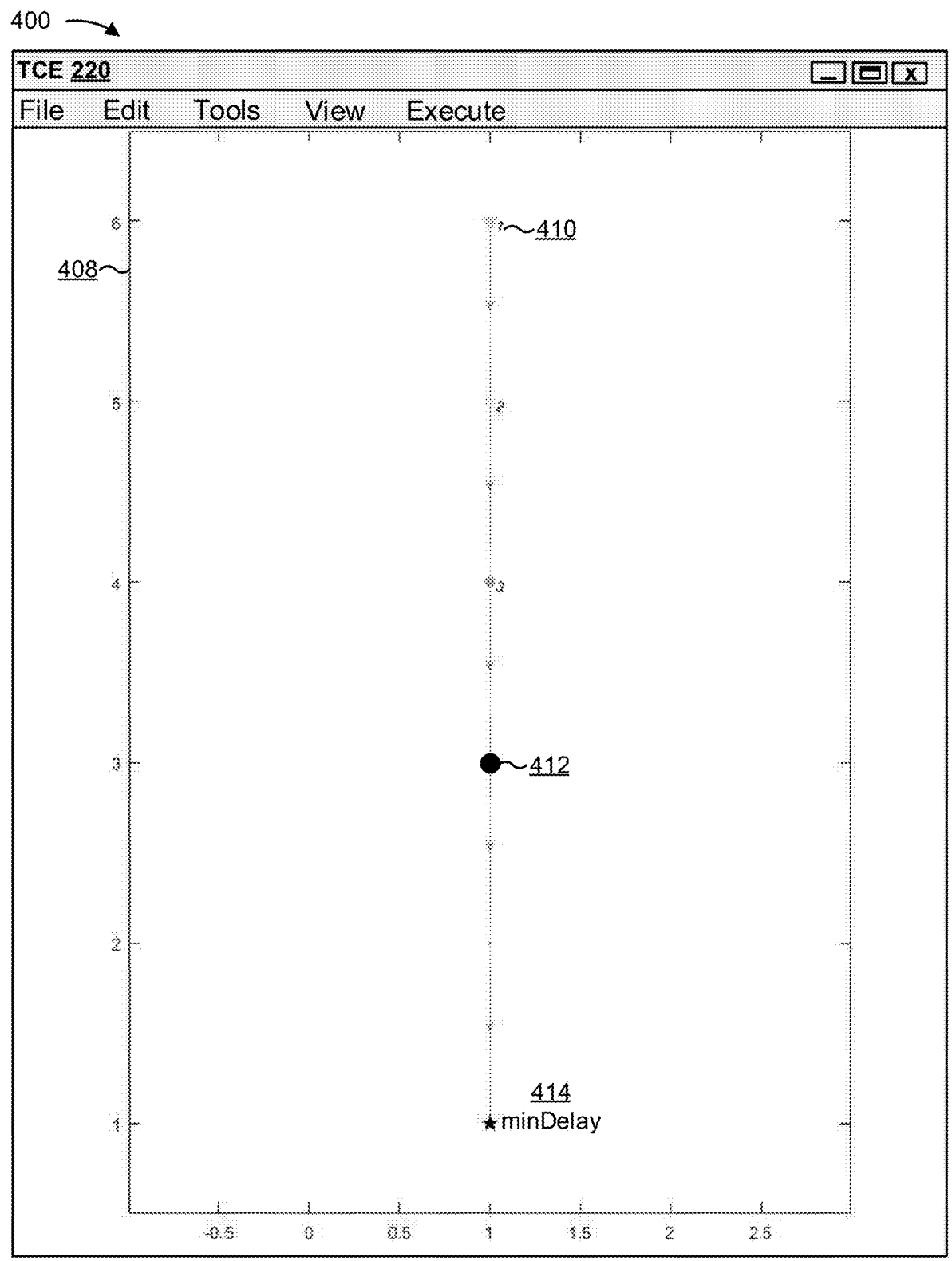

As shown in FIG. 4B, the graphical representation, shown by reference number 408, may include nodes, which are shown as dots in the graphical representation, and which are connected by arrows. Here, node 410 represents the variable tt.ArrDelay and node 412 represents the reduction operation to determine the minimum value of tt.ArrDelay (e.g., minDelay). Node 414 may represent a write operation to store minDelay. Other nodes are shown, and may correspond to operations to determine dimensions of tt.ArrDelay, checksums, or the like.

Client device 210 may execute the data structure corresponding to tt.ArrDelay, or may postpone evaluation until a user requests a value of minDelay. In some implementations, client device 210 may generate an intermediate representation based on the data structure associated with graphical representation 408, and may generate processing modules to perform the operations identified by the data structure, as described in more detail in connection with FIGS. 5A and 5B, below. In this way, client device 210 conserves processor and other computer resources that would otherwise be used to perform the reduction operation upon receiving the program code.

Figure 4C:
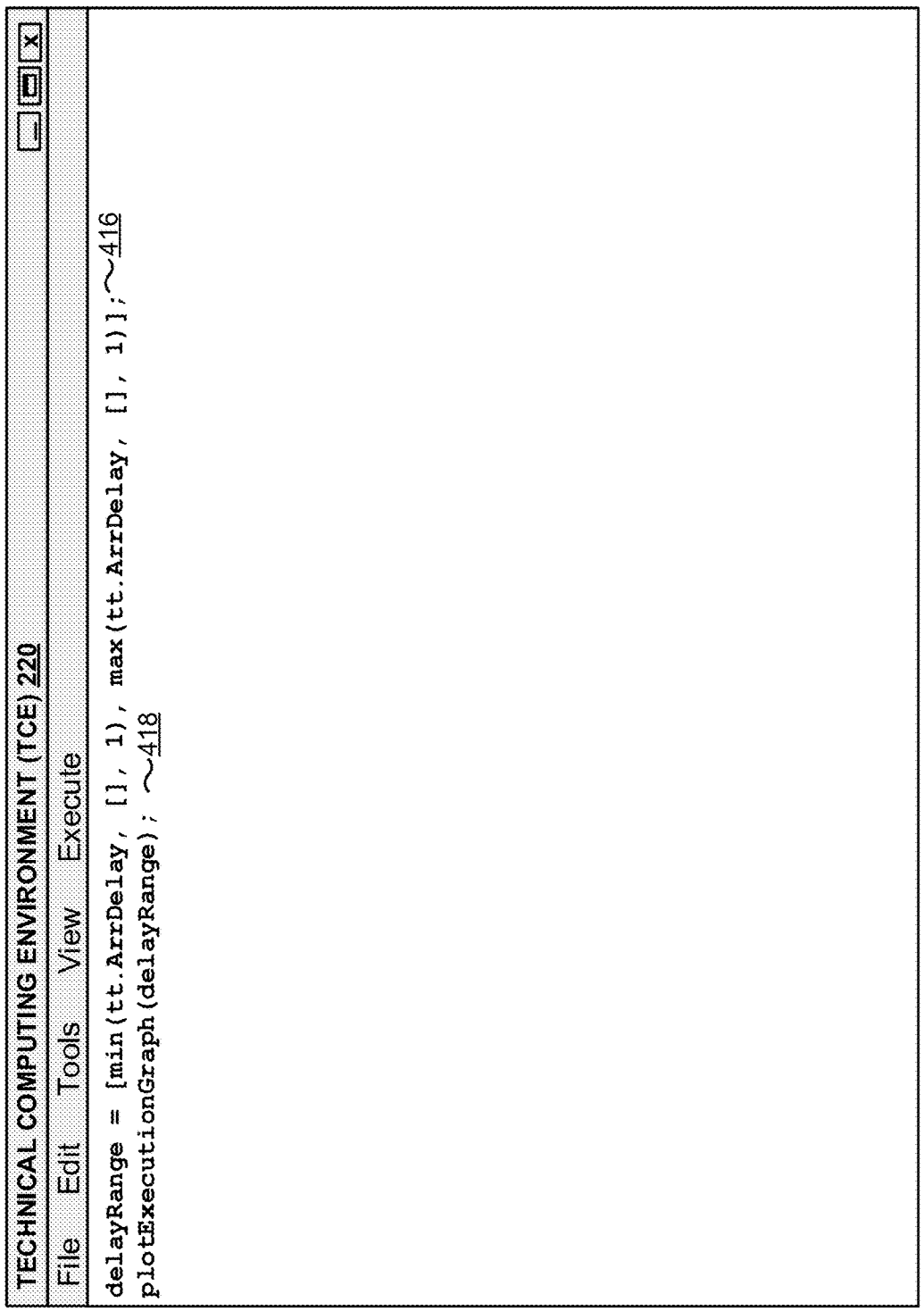

FIG. 4C is an example of program code that identifies a set of operations that includes two reduction operations. As shown in FIG. 4C, and by reference number 416, client device 210 may receive program code including a first line of delayRange=[min(tt.ArrDelay, [ ], 1), max(tt.ArrDelay, [ ], 1)]. The first line includes a first reduction operation of min(tt.ArrDelay, [ ], 1) and a second reduction operation of max(tt.ArrDelay, [ ], 1). If client device 210 executes the program code without performing read-write reduction, client device 210 may perform a first read of the data set for the first reduction operation, and may perform a second read of the data set for the second reduction operation, as shown in more detail in connection with FIG. 4D, below. Based on the first reduction operation and the second reduction operation, client device 210 may output the variable delayRange including a maximum value of the elements of tt.ArrDelay and a minimum value of the elements of tt.ArrDelay. As shown by reference number 418, client device 210 may receive a second line of program code (e.g., plotExecutionGraph(delayRange);) to cause client device 210 to provide, for display, a graphical representation of a data structure corresponding to delayRange.

Figure 4D:
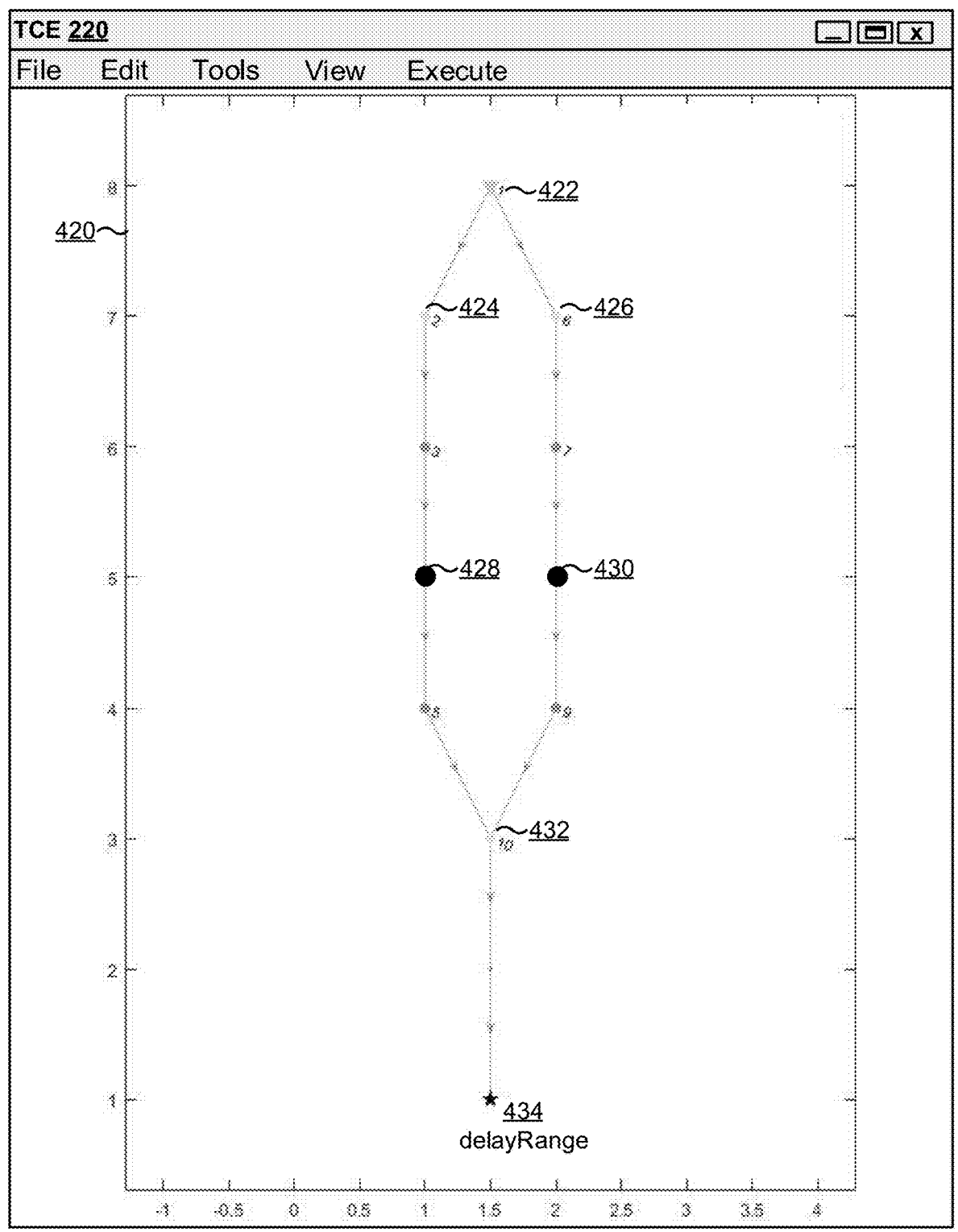

FIG. 4D is an example of the graphical representation of the data structure that may be generated based on the program code described in connection with FIG. 4C, above. As shown in FIG. 4D, graphical representation 420 of the data structure may include nodes. Node 422 may correspond to the tall variable tt.ArrDelay. As shown by reference numbers 424 and 426, the first reduction operation (corresponding to node 428) and the second reduction operation (corresponding to node 430) may be associated with respective branches of the data structure. Node 432 may correspond to a horizontal concatenation operation to combine outputs associated with nodes 428 and 430 to form the array associated with delayRange (corresponding to node 434). In some implementations, client device 210 may provide, for display, information identifying the nodes (e.g., a legend, a tooltip, etc.).

Figure 4E:
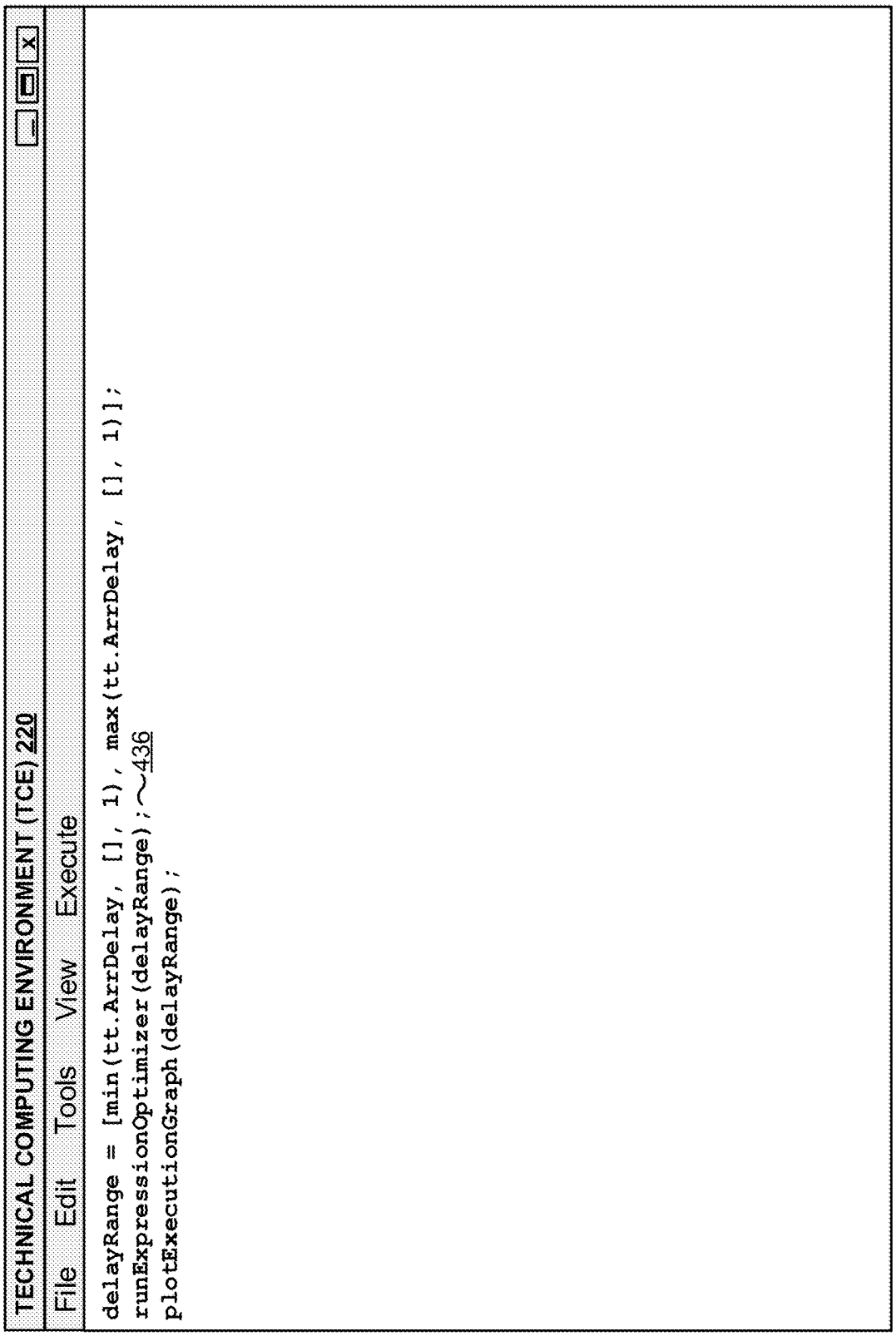
Figure 4F:
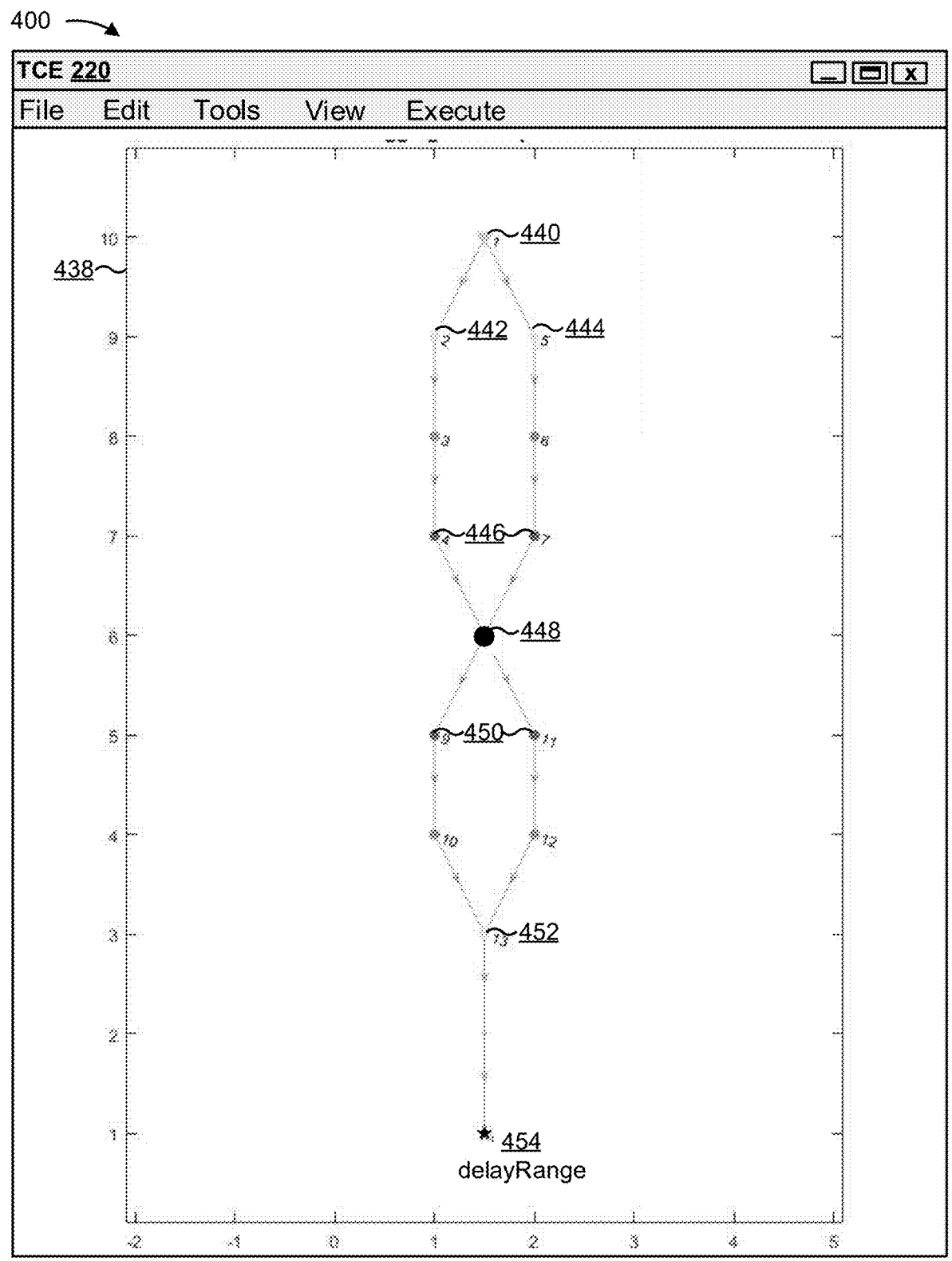

FIGS. 4E and 4F relate to an example of a reduced data structure corresponding to the data structure described in connection with FIGS. 4C and 4D. As shown in FIG. 4E, and by reference number 436, client device 210 may receive an instruction to perform read-write reduction with regard to the variable delayRange (e.g., runExpressionOptimizer(delayRange)) and an instruction to generate a graphical representation of a reduced data structure corresponding to delayRange (e.g., plotExecutionGraph(delayRange);).

As shown in FIG. 4F, graphical representation 438 of the reduced data structure corresponding to delayRange may include node 440, corresponding to the tall variable of tt.ArrDelay. As shown by reference numbers 442 and 444, the reduced data structure may include the respective branches corresponding to the first reduction operation and the second reduction operation. As shown by reference number 446, the respective branches may converge at node 448.

Node 448 may correspond to the first reduction operation and the second reduction operation. For example, based on the first reduction operation and the second reduction operation receiving the same input (e.g., tt.ArrDelay), client device 210 may determine that the first reduction operation and the second reduction operation can be performed based on a single read operation or based on a single pass through the data set associated with tt.ArrDelay. Thus, client device 210 may combine nodes 428 and 430, of the data structure shown in FIG. 4D, to form node 448 of the reduced data structure. When the program code is executed, client device 210 may perform a single read operation or a single pass through the data set to perform the first reduction operation and the second reduction operation, thereby conserving resources of client device 210 and/or server device 230. Nodes 446 and 450 may correspond to data format conversions to ensure that the combined reduction operation identified by node 448 receives a compatible input and/or generates a compatible output. Node 452 may correspond to a horizontal concatenation operation to combine outputs associated with node 450 to form the array associated with delayRange (corresponding to node 454)

Figure 4G:
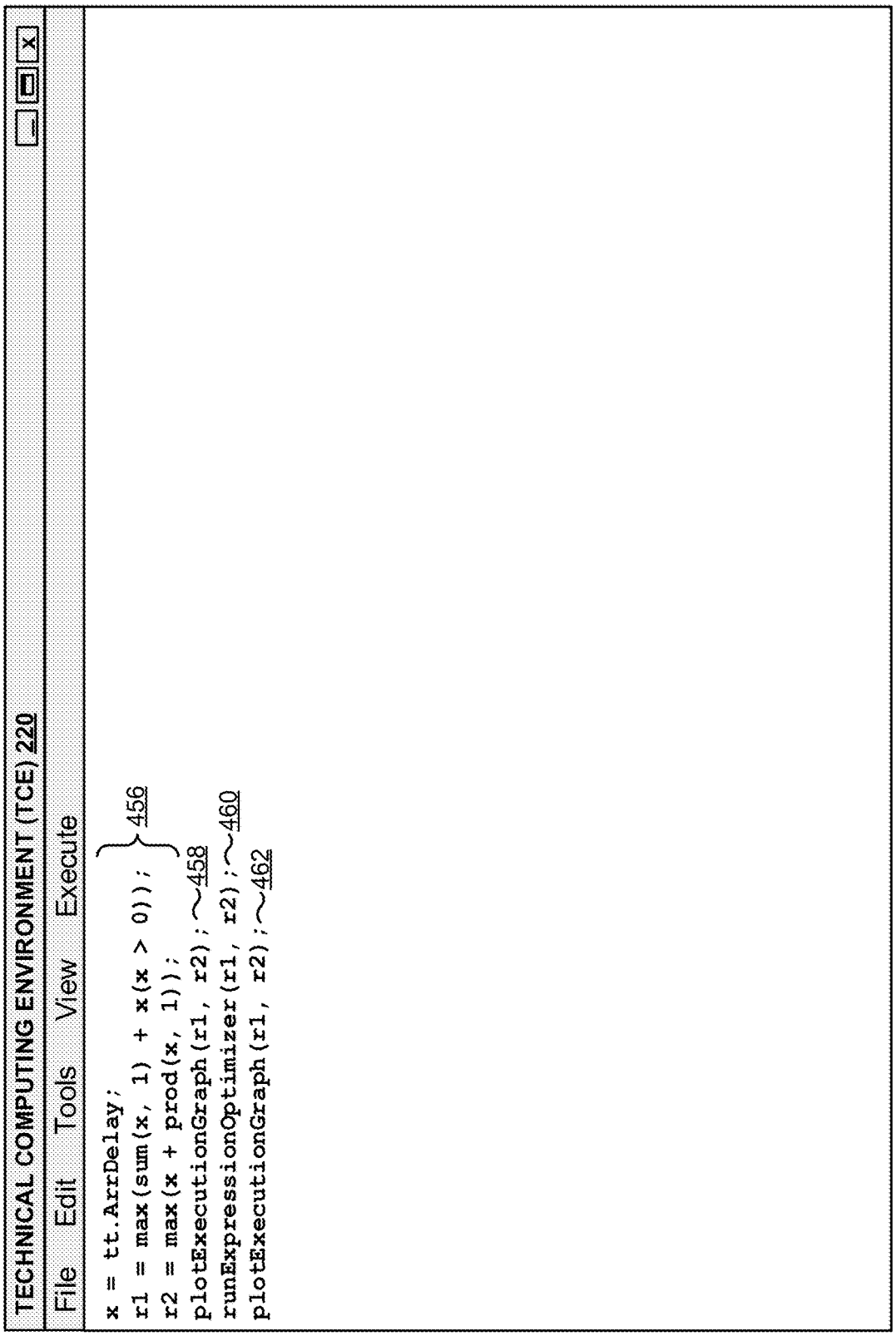
Figure 4H:
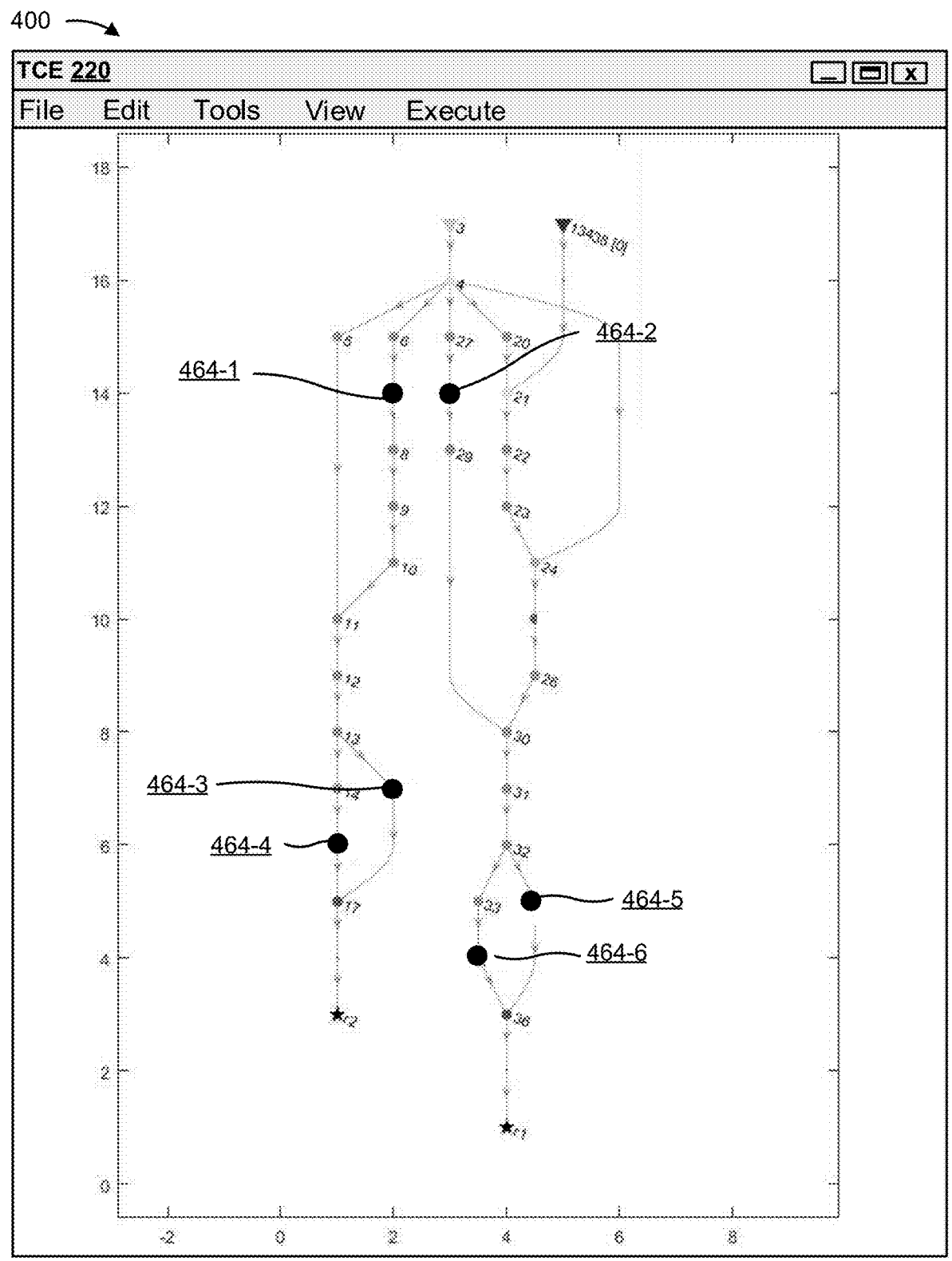
Figure 4I:
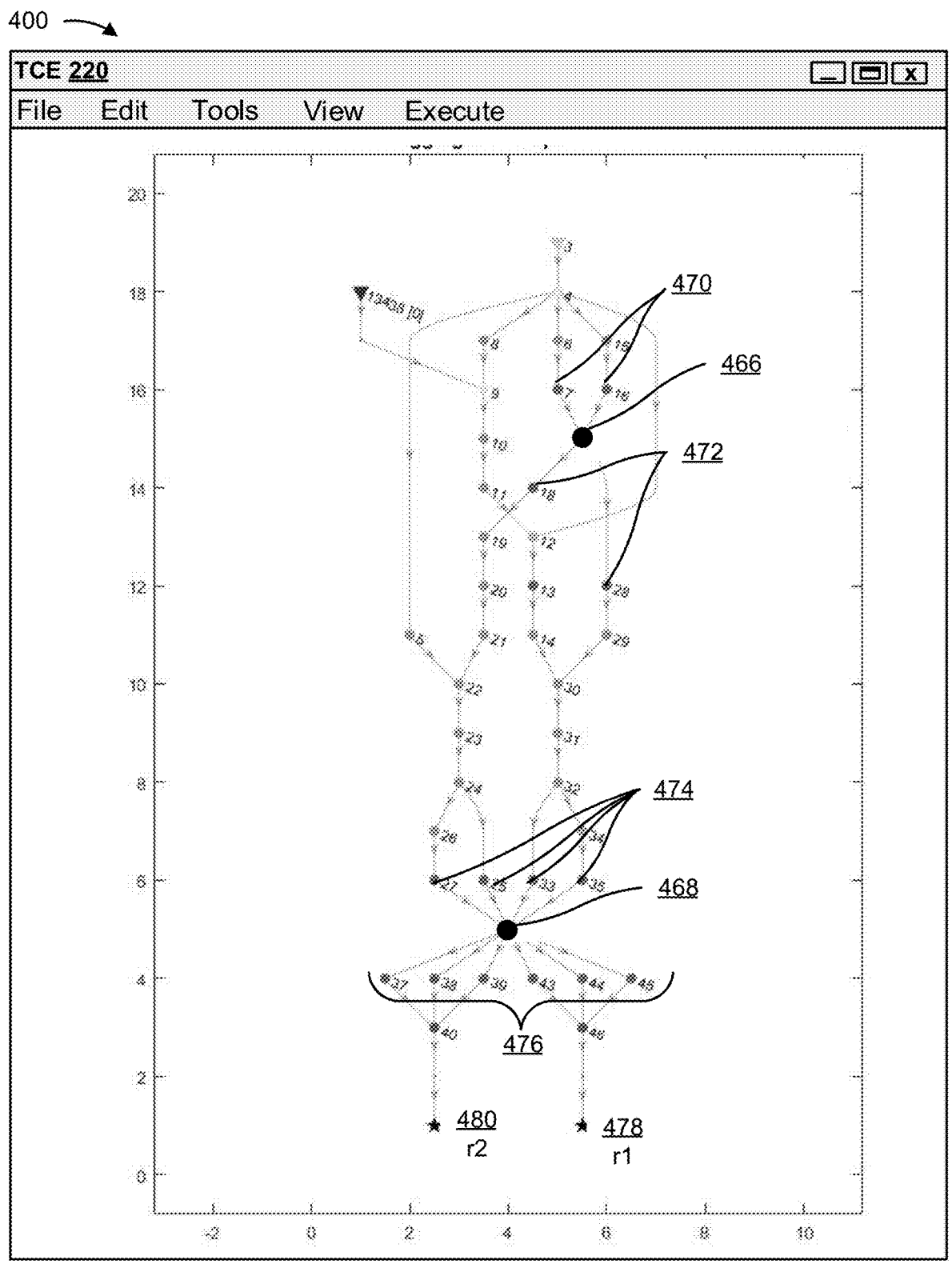

FIGS. 4G-4I are examples of program code identifying a set of operations to be performed, a data structure describing the set of operations, and a reduced data structure that is generated based on the data structure describing the set of operations. As shown in FIG. 4G, client device 210 may receive program code. As shown by reference number 456, the program code may identify a set of operations to perform with regard to a tall variable (e.g., tt.ArrDelay). As shown, the set of operations includes:

$x=tt.\text{ArrDelay};$ $r1=\max(\text{sum}(x,1)+x(x>0));$ $r2=\max(x+\text{prod}(x,1));$ As shown by reference number 458, client device 210 may receive an instruction to generate a graphical representation of a data structure corresponding to the set of operations (e.g., plotExecutionGraph(r1, r2);). The graphical representation of the data structure is shown and described in connection with FIG. 4H, below. As shown by reference number 460, client device 210 may receive an instruction to perform read-write reduction with regard to the data structure (e.g., runExpressionOptimizer(r1, r2);). As shown by reference number 462, client device 210 may receive an instruction to generate a graphical representation of the reduced data structure (e.g., plotExecutionGraph(r1, r2);). The graphical representation of the reduced data structure is shown and described in connection with FIG. 4I, below.

As shown in FIG. 4H, the graphical representation of the data structure may include nodes 464. Nodes 464 may correspond to reduction operations included in the program code (e.g., a summation operation, a maximum operation, etc.). As shown, before client device 210 performs read-write reduction, the data structure includes nodes 464-1 through 464-6, corresponding to reduction operations included in the set of operations. As further shown, the graphical representation of the data structure may include other nodes. The other nodes may correspond to input values, output values, element-wise operations, concatenation operations, or the like. Here, the other nodes are not described in detail because the other nodes are unlikely to significantly affect the efficiency of executing the program code as compared to nodes 464.

As shown in FIG. 4I, client device 210 may combine the reduction operations to form combined operations. As shown, the graphical representation of the reduced data structure may include nodes 466 and 468. Node 466 may correspond to the reduction operations associated with nodes 464-1 and 464-2 in FIG. 4H, and node 468 may correspond to the reduction operations associated with nodes 464-3, 464-4, 464-5, and 464-6. For example, client device 210 may perform the reduction operations associated with nodes 464-1 and 464-2 based on a first read operation to obtain tt.ArrDelay. Further, client device 210 may perform the reduction operations associated with nodes 464-3, 464-4, 464-5, and 464-6 based on outputs of the reduction operations associated with nodes 464-1 and 464-2 (e.g., based on a single read operation to obtain the outputs). In this way, client device 210 reduces a quantity of read operations associated with the set of operations from six read operations to two read operations, which conserves resources and improves efficiency of performing the set of operations.

In some implementations, client device 210 may assign reduction level identifiers to reduction operations, and may identify reduction operations to combine based on the reduction level identifiers. A reduction level identifier for a particular reduction operation may identify a quantity of reduction operations, or a quantity of read operations, to be performed to obtain input data for the particular reduction operation. For example, in FIG. 4H, nodes 464-1 and 464-2 may be associated with a reduction level identifier of 0, indicating that no reduction operation is to be performed to obtain input data for reduction operations corresponding to nodes 464-1 and 464-2. As another example, nodes 464-3 through 464-6 may be associated with a reduction level identifier of 1, indicating that a reduction operation associated with node 464-1 is to be performed to obtain input data for nodes 464-3 and 464-4, and that a reduction operation associated with node 464-2 is to be performed to obtain input data for nodes 464-5 and 464-6.

Client device 210 may use the reduction level identifiers to generate the reduced data structure. For example, client device 210 may combine each reduction operation that is associated with a particular reduction level and that receives a particular input (e.g., nodes 464-1 and 464-2, or nodes 464-3 through 464-6). As another example, client device 210 may not combine reduction operations that are associated with different reduction level identifiers. Thus, client device 210 reduces a quantity of read operations needed to obtain input data for the reduction operations.

Nodes 470, 472, 474, and 476 may correspond to data format conversions to ensure that the combined reduction operations identified by nodes 466 and 468 receive compatible inputs and/or generate compatible outputs. Here, nodes 470 correspond to two operations based on the two reduction operations associated with node 466, and nodes 474 correspond to four operations based on the four reduction operations associated with node 468. As further shown, the graphical representation may include nodes 478 and 480, which may correspond to the outputs r1 and r2, respectively.

As indicated above, FIGS. 4A-4I are provided merely as an example. Other examples are possible and may differ from what was described with regard to FIGS. 4A-4I.

Figure 5A:
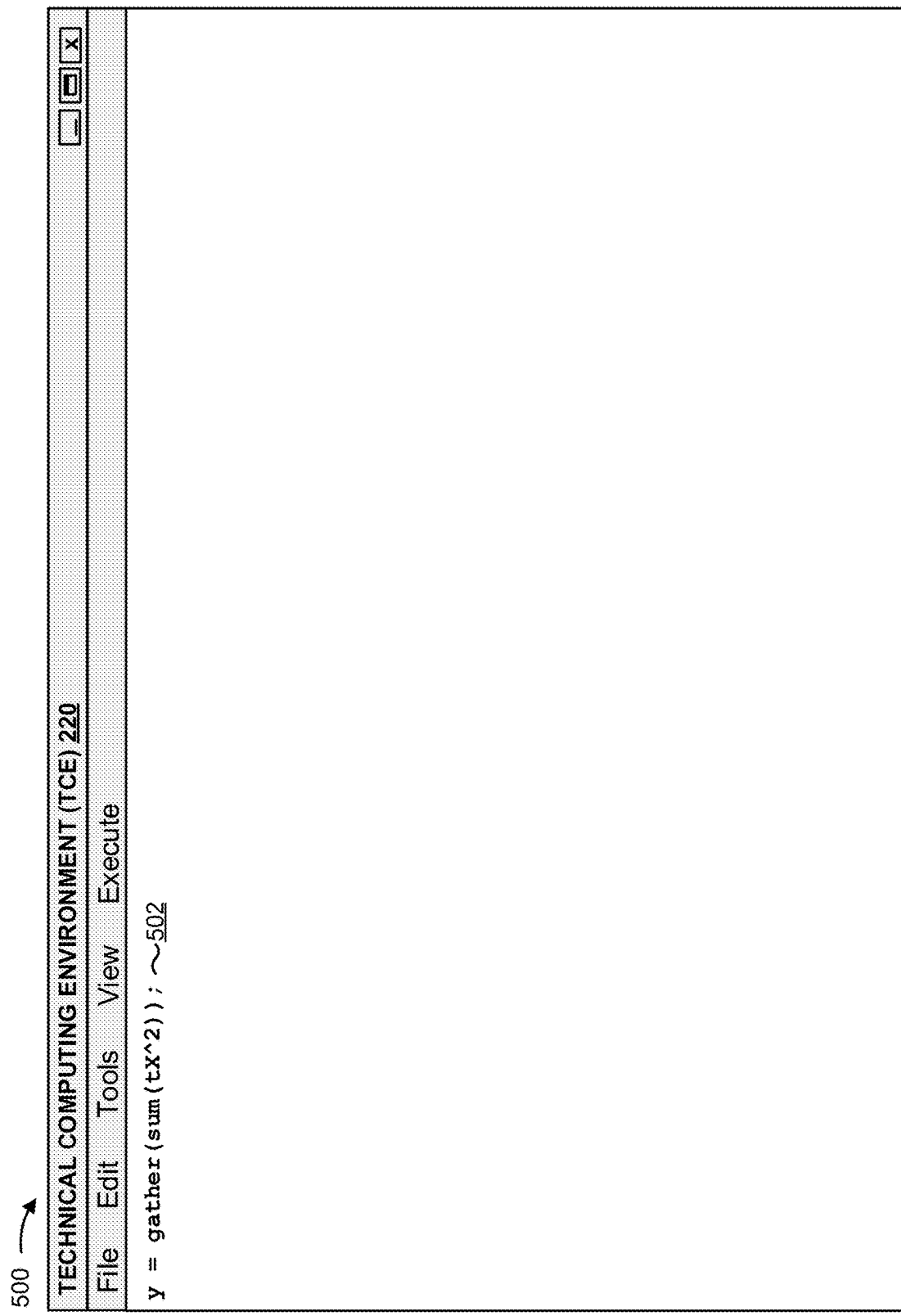
FIGS. 5A and 5B are diagrams of an example implementation of identifying operations to perform in parallel when processing big data.
Figure 5B:
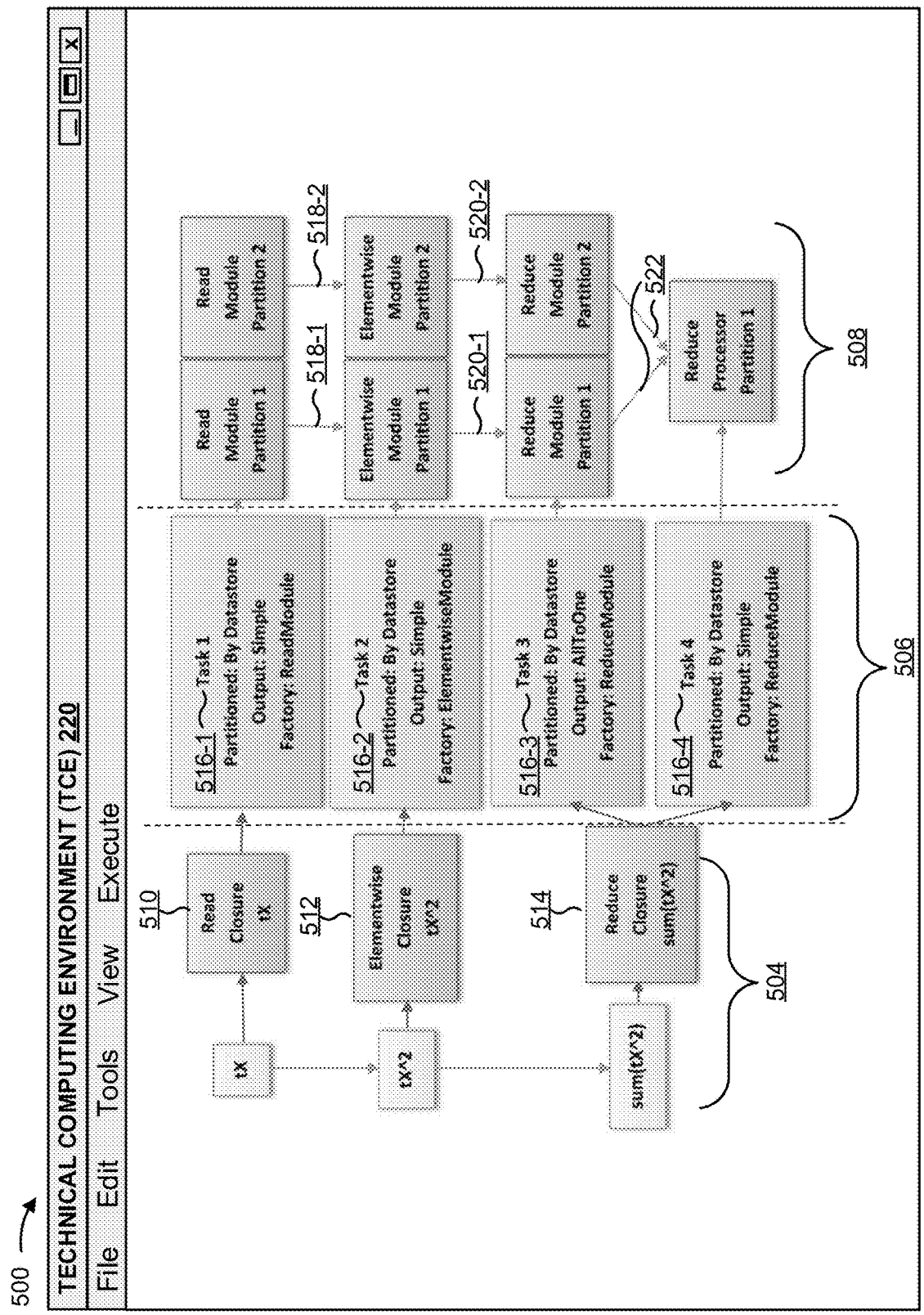

FIGS. 5A and 5B are diagrams of an example implementation 500 of identifying operations to perform in parallel when processing big data. FIGS. 5A and 5B include a data structure that is generated based on program code, an intermediate representation that is generated based on the data structure, and a set of processing modules that are generated based on the data structure and the intermediate representation. Client device 210 may use the intermediate representation to identify operations that can be performed in parallel. Further, client device 210 may use the intermediate representation to generate processing modules, which may perform the operations described by the data structure and the intermediate representation. In the examples shown in FIGS. 5A and 5B, the programming environment is TCE 220 executing on a device (e.g., client device 210 or server device 230).

As shown in FIG. 5A, and by reference number 502, client device 210 may receive program code identifying a set of operations to perform on a tall variable. Here, the tall variable is tX, and the operations include one or more read operations to obtain a data set associated with tX, an element-wise operation to determine a value of sum(tX^2), a reduction operation to determine a sum of the values of tX, and a gather operation to cause client device 210 to provide the sum of the values of tX. For the purpose of FIGS. 5A and 5B, assume that tX is associated with a data set that is stored in two partitions on two respective server devices 230.

An element-wise operation may include an operation that is performed on each element of a tall variable. For example, "tX^2" is an element-wise operation. When an element-wise operation receives an input array (e.g., a tall array or a non-tall array) as input, the element-wise operation outputs an output array that includes dimensions equal to the input array. A gather operation is an operation that may cause client device 210 to execute a set of program code that is associated with a reduced data structure to determine a value identified by the gather operation (e.g., the sum of the values of tX^2).

FIG. 5B shows a data structure 504 that may be generated based on the program code, an intermediate representation 506 that is generated based on data structure 504, and a set of processing modules 508 to perform the operations identified by data structure 504. As shown by reference number 510, data structure 504 may include a first closure corresponding to the read operation to obtain the data set associated with the tall variable of tX. As shown by reference number 512, data structure 504 may include a second closure corresponding to the element-wise operation to determine the value of tX^2. As shown by reference number 514, data structure 504 may include a third closure corresponding to the reduction operation to determine the sum of the values of tX^2.

As shown, intermediate representation 506 may include execution tasks 516-1 through 516-4, corresponding to the closures of data structure 504. As shown, each execution task 516 may include a task identifier (e.g., Task 1, Task 2, Task 3, and Task 4), a partition identifier (e.g., Partitioned: By Datastore), an output type (e.g., Simple, indicating that the execution task receives one input array and generates one output array, or AllToOne, indicating that the execution task receives multiple input arrays and generates one output array), and a factory identifier.

The partition identifier may indicate that the tall variable is divided into partitions corresponding to respective devices that store the partitions. The factory identifier may identify a processing module to generate to execute an operation corresponding to the execution task. For example, a factory identifier of execution task 516-1 indicates to generate a read processing module corresponding to the read operation associated with execution task 516-1. As another example, a factory identifier of execution task 516-2 indicates to generate an element-wise processing module corresponding to the element-wise operation associated with execution task 516-2. As a third example, a factory identifier of execution task 516-3 indicates to generate a reduction processing module corresponding to first reduction operations to determine sums of each of the two partitions of tX. As a fourth example, a factory identifier of execution task 516-4 indicates to generate a reduction processing module corresponding to a second reduction operation to determine a sum of the sums of the two partitions.

Based on the partition identifiers and the factory identifiers, client device 210 may identify processing modules that can be executed in parallel. For example, based on tX being associated with a first partition and a second partition, client device 210 may determine that the read operation can be performed in parallel on the two partitions, the element-wise operation can be performed in parallel on the two partitions, and the first reduction operation can be performed in parallel on the two partitions. Client device 210 may generate the processing modules based on identifying the execution tasks that can be performed in parallel, as described in more detail below.

As shown, client device 210 may generate processing modules 508 based on intermediate representation 506. As shown, processing modules 508 may include a first read processing module to obtain a first partition of tX and a second read processing module to obtain a second partition of tX. For example, the first read processing module may be executed by a first context and the second read processing module may be executed by a second context (e.g., in parallel). In some implementations, both read processing modules may be executed by the same context (e.g., in series). Thus, efficiency of execution of the program code is improved.

As further shown, processing modules 508 may include a first element-wise processing module to perform the element-wise operation on the first partition of tX and a second element-wise processing module to perform the element-wise operation on the second partition of tX. The vertical arrow 518-1 from the first read processing module to the first element-wise processing module, and the vertical arrow 518-2 from the second read processing module to the second element-wise processing module, may indicate that the respective element-wise processing modules receive, as input from the respective read processing modules, elements of the first partition of tX and the second partition of tX, respectively.

As further shown, processing modules 508 may include first reduction processing modules to determine sums of the values of tX of the first partition and the second partition, respectively. As shown by reference numbers 520-1 and 520-2, the first reduction processing modules may receive, as input, values of tX that are outputted by the element-wise processing modules. As shown by reference number 522, the first reduction processing modules may output, to the second reduction processing module, the sum of the first partition of tX and the sum of the second partition of tX. The second reduction processing module may determine the sum of the two input sums, and may output the value.

In this way, client device 210 generates a data structure of closures based on program code, an intermediate representation based on the data structure of closures, and a set of processing modules based on the intermediate representation. By identifying inputs and outputs of the program code based on the closures and the intermediate representation, client device 210 may parallelize execution of processing modules, thereby improving efficiency and reducing processing time associated with the processing modules.

In some implementations, client device 210 may combine operations, processing modules, or the like, based on the closures and/or the execution tasks, as described in more detail elsewhere herein. For example, client device 210 may generate a reduced data structure based on data structure 504 to reduce a quantity of read operations to be performed. As another example, data structure 504 may be a reduced data structure corresponding to an original data structure that is not described with regard to FIGS. 5A and 5B. Thus, client device 210 improves performance of big data processing and reduces a quantity of read-write operations needed to perform the big data processing.

As indicated above, FIGS. 5A and 5B are provided merely as examples. Other examples are possible, and may differ from what was described with regard to FIGS. 5A and 5B.

FIG. 6 is a flow chart of an example process 600 for generating and modifying a data structure to reduce read/write operations when processing big data. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include receiving program code that identifies operations to perform with regard to a tall variable (block 610). For example, client device 210 (e.g., TCE 220) may receive program code. The program code may identify operations to perform with regard to a tall variable corresponding to a big data set. In some implementations, client device 210 may receive the program code based on a user input (e.g., based on a user inputting the program code, etc.), may obtain the program code from storage (e.g., from local storage, from server device 230, based on a user input specifying a location at which the program code is stored, etc.), may download the program code from a web server, or the like.

The data set may include data of a particular data type, such as a table data type, a double data type, a single data type, an int8 data type, an int16 data type, an int32 data type, an int64 data type, a uint8 data type, a uint16 data type, a uint32 data type, a uint64 data type, a logical data type, a character data type, a datetime data type, a duration data type, a calendar duration data type, a string data type, a cell data type, a structure data type, an image data type, a video data type, or any other data type. For example, the data set may include an array of elements of the particular data type. In some implementations, the data set may include elements of multiple, different data types.

In some implementations, an operation may include an aggregation operation. An aggregation operation may perform an operation on one or more partitions of an input array (e.g., a tall array or a non-tall array), and may subsequently perform a reduction operation on the one or more partitions. As an example, an operation that counts a quantity of elements in a tall array, then determines a sum of the elements of the tall array, may be an aggregation operation. In some implementations, when an aggregation operation receives two or more input arrays, client device 210 may determine whether sizes of the input arrays match in the tall dimension. When the sizes do not match, client device 210 may generate an error, may modify one or more of the input arrays to cause the sizes to match, or the like.

In some implementations, an operation may include a slice-wise operation. A slice-wise operation may preserve a size of the data set in the tall direction. For example, the operation may receive one or more input arrays (e.g., tall arrays or non-tall arrays) and may perform an operation on each slice of the one or more input arrays. In some implementations, client device 210 may perform a slice-wise operation on two or more tall arrays. When tall dimensions of the two or more tall arrays do not match in size, client device 210 may generate an error, may modify one or more of the tall arrays to cause the tall dimensions to match, or the like.

In some implementations, an operation may include a filter operation. A filter operation may receive one or more input arrays (e.g., tall arrays or non-tall arrays) and may generate a filtered array based on a logical test. For example, client device 210 may receive an input array, may process portions (e.g., elements, slices, partitions, etc.) of the input array based on a logical test, and may selectively include or exclude the portions from the filtered array based on results of the logical test. In some implementations, client device 210 may receive multiple input arrays. Client device 210 may process each input array based on a logical test, and may generate one or more filtered arrays based on the input arrays. For example, client device 210 may generate multiple filtered arrays corresponding to the multiple input arrays, may generate a single filtered array by concatenating filtered arrays associated with each of the input arrays, or the like.

In some implementations, an operation may include a union operation. A union operation may concatenate two or more arrays in the tall dimension. For example, assume that a first array is associated with a size of [x, 10], where x is associated with the tall dimension, and assume that a second array is associated with a size of [y, 10], where y is associated with the tall dimension. A union operation may receive the first array and the second array, and may generate an output array of size [x+y, 10], where x+y is in the tall dimension. In some implementations, when two or more input arrays are associated with different sizes in a non-tall dimension, client device 210 may generate an error, may cause the one or more input arrays to have matching sizes in the non-tall dimension, or the like.

In some implementations, an operation may include a re-partition operation. A re-partition operation may modify a particular dimension, a storage location, and/or corresponding contexts of one or more partitions of an input partitioned array. By modifying partitions associated with the input partitioned array, client device 210 may improve performance when processing the input array. For example, if a partition is associated with a context on a different server device 230 than a server device 230 on which the partition is stored, client device 210 may cause the partition to be stored by the server device 230 on which the context is executed. Thus, client device 210 improves performance of the context.

In some implementations, an operation may be associated with a key. A key may identify a value corresponding to an element of an array, and may permit client device 210 to perform operations with regard to the element of the array based on identifying the key. For example, assume that a tall array includes a first row identifying addresses and a second row identifying corresponding countries in which the addresses are located. In such a case, client device 210 may perform one or more operations on elements of the first row using elements of the second row as a key. For example, if an array stores a first row of elements identifying phone numbers and a second row of elements identifying countries corresponding to the phone numbers, client device 210 may delete each phone number from a particular country. As another example, client device 210 may rearrange the first row and the second row based on the corresponding key values. As a third example, client device 210 may combine elements from the first row with elements of another array based on the elements of the other array being associated with matching key values. As a fourth example, client device 210 may perform an aggregation operation with regard to particular elements of the first row based on key values associated with the particular elements. Other examples are possible, and implementations described herein are not limited to the above four examples.

In some implementations, an operation may include an element-wise operation, and may receive two or more input arrays. When an element-wise operation receives two or more input arrays, client device 210 may determine whether dimensions of each of the two or more input arrays are equal. For example, consider the element-wise operation: arrayC=arrayA+arrayB. Client device 210 may determine each element of array C based on determining a sum of a corresponding element of arrayA and a corresponding element of arrayB. Therefore, when performing the operation, client device 210 may determine whether dimensions of arrayA are equal to dimensions of arrayB. When the dimensions are not equal, client device 210 may generate an error, may cause the dimensions to be equal (e.g., by generating additional values for arrayA and/or arrayB, by removing values from arrayA or arrayB, by duplicating one or more rows or columns of arrayA and/or arrayB, etc.), or the like.

In some implementations, an operation may be associated with a particular partition. For example, the operation may include a reduction operation with regard to the particular partition, a concatenation of the particular partition to another partition, an aggregation operation with regard to the particular partition, a cache operation with regard to the particular partition, or the like.

In some implementations, an operation may include a cache operation. A cache operation may cause client device 210 to store part of, or all of, an array (e.g., a tall array or a non-tall array). For example, when an array may be used for multiple, different operations, client device 210 may use a cache operation to store the array in local memory, which may save time and read/write operations that would otherwise be used to obtain the array from storage to perform each of the multiple, different operations.

Other operations are possible (e.g., combinations of the above operations, operations not described above, combinations of the above operations and operations not described above, etc.), and implementations described herein are not intended to be limited to the operations described above.

In some implementations, the program code may include a function handle. A function handle may identify a function or an operation, and may store information relating to the function or the operation. In some implementations, the function handle may be associated with a non-tall function library, and may identify a particular operation that can be performed with regard to a non-tall variable (e.g., $\sin(x)$, $x^2$, etc.). When client device 210 executes a non-tall function handle that identifies a tall variable, client device 210 may perform the particular operation with regard to elements of the tall variable. In this way, client device 210 improves compatibility with existing function libraries, thereby reducing user error and conserving processor resources that would otherwise be used to execute erroneous code.

In some implementations, the function handle may be associated with a big data primitive. A big data primitive may refer to a programming language primitive that identifies an operation to perform with regard to a tall variable (e.g., an aggregation operation, a cache operation, a reduction operation, a re-partition operation, etc.). In such a case, the function handle may be associated with information defining a class associated with the operation. A class may identify information related to executing big data primitives, as described in more detail below.

In some implementations, a class may identify whether a corresponding operation can return an error. For example, if a particular operation is known never to return an error (e.g., if no error condition is defined with regard to the particular operation), the class may include error information indicating that the particular operation is known never to return an error. Based on the error information, client device 210 may store information based on which to generate an error message. For example, if the particular operation is not compatible with a tall variable of a particular data type, client device 210 may store information identifying the particular data type, and may use the information to generate an error message when client device 210 receives program code indicating to apply the particular operation to a tall variable of the particular data type.

In some implementations, a class may identify whether an operation uses a value that is obtained from outside of a partition on which the operation is performed. For example, some operations may use external state information, such as a randomly generated number, a time value, a global variable, a persistent value, or the like, that is not defined within a particular partition. A class corresponding to a particular operation may include an indicator that specifies whether the particular operation is externally stateless (i.e., whether the particular operation does not obtain external state information when executed). Client device 210 may generate a reduced data structure based on the indicator, as described in more detail below, which reduces a quantity of read-write operations to be performed by client device 210.

In some implementations, a class may identify a quantity of data that can be processed based on an operation. For example, if a particular operation can process twenty slices of a tall variable as a single input, the class may store information indicating that the particular operation is to be passed a maximum of twenty slices based on a particular function call.

In some implementations, an operation may relate to a non-tall array. A non-tall array is an array that is not distributed across multiple storage locations and/or that has known dimensions. A non-tall array may fit in local memory of client device 210. For example, a 1×10 array of random numerical values may be a non-tall array. In some implementations, client device 210 may perform operations on non-tall arrays based on the same or similar operations as a tall array. For example, assume that client device 210 receives program code identifying a set of operations, including one or more big data primitives, to perform with regard to a particular array. Client device 210 may perform the set of operations on the particular array irrespective of whether the particular array is a tall array or a non-tall array. In this way, client device 210 improves uniformity of primitives, function handles, and the like, thereby reducing user error.

In some implementations, client device 210 may receive program code relating to multiple, different tall variables. For example, the program code may indicate to perform an element-wise or slice-wise operation with regard to two or more tall variables, to perform a reduction operation with regard to two or more tall variables, or the like. In some cases, a particular operation may require each input tall variable to have matching partitions (e.g., a matching quantity of partitions, matching dimensions in each partition, or the like). In such a case, client device 210 may perform a re-partition operation to cause each input tall variable to have matching partitions. For example, client device 210 may move one or more partitions to a particular device, may change dimensions of one or more partitions, or the like, to cause each input tall variable to have matching partitions.

As further shown in FIG. 6, process 600 may include generating an original data structure that identifies relationships between the operations based on inputs and outputs associated with the operations (block 620). For example, client device 210 (e.g., TCE 220) may generate an original data structure, such as a tree, an abstract syntax tree, a directed graph, or the like. Client device 210 may generate the original data structure based on inputs and outputs associated with the operations. Additionally, or alternatively, client device 210 may generate the original data structure based on operation types of the operations. For example, client device 210 may connect nodes of the original data structure based on relationships between operations corresponding to the nodes and/or based on operation types of the operations corresponding nodes, as described in more detail elsewhere herein.

In some implementations, client device 210 may determine and/or provide an intermediate value based on generating an original data structure. An intermediate value is a value that is outputted by a first operation, and that is used as input by a second operation. For example, assume that client device 210 receives a first instruction to obtain a tall array, a second instruction to perform an element-wise or slice-wise operation on the tall array to generate a modified array, and a third instruction to perform a reduction operation on the modified array. Client device 210 may provide, for display, a portion of the tall array based on receiving the first instruction (e.g., a first five values of the tall array, a first ten values of the tall array, etc.). After performing the element-wise or slice-wise operation, client device 210 may provide, for display, a portion of the modified array (e.g., a first five values, a first ten values, etc.). In some implementations, client device 210 may not provide, for display, a result of the reduction operation. For example, client device 210 may not determine the result until client device 210 receives a request for the result, thereby saving time and reducing a quantity of read-write operations required to determine the result.

In some implementations, client device 210 may perform an operation with regard to a portion of a tall array, and may provide information based on providing the operation with regard to the portion. For example, when the operation is an element-wise operation or a slice-wise operation, client device 210 may perform the operation with regard to a portion of the tall array, and may provide the portion of the tall array (e.g., as a preview of a result of performing the operation). In this way, client device 210 may provide previews of results of performing an operation without performing the operation on an entirety of the tall array, which improves user experience and conserves processor resources and/or read operations that would otherwise be used to perform the operation with regard to the entirety of the tall array.

As further shown in FIG. 6, process 600 may include determining a reduced data structure, based on the original data structure, to reduce a quantity of data reads and/or data writes associated with performing the operations (block 630). For example, client device 210 (e.g., TCE 220) may determine (e.g., generate) a reduced data structure, as shown in FIGS. 4F and 4I, above. To determine the reduced data structure, client device 210 may identify reduction operations that receive a particular input, and may combine the reduction operations to form a combined operation. The combined operation may receive the particular input (e.g., based on a read operation to obtain the particular input), and may perform each of the reduction operations based on the particular input.

In some implementations, client device 210 may combine operations based on an operation type of the operations. For example, when each operation, of a set of reduction operations, can be performed based on a particular input, client device 210 may combine the set of reduction operations to form a combined operation in the reduced data structure. In this way, client device 210 reduces a quantity of read operations to be performed with regard to a tall variable.

In some implementations, client device 210 may determine a reduced data structure based on a function handle and/or a class associated with the function handle. For example, when two or more operations receive the same input, and when function handles of the two or more operations indicate that the two or more operations do not obtain external state information, client device 210 may combine the two or more operations into a single operation. Thus, client device 210 reduces a quantity of read operations to be performed with regard to the two or more operations.

As further shown in FIG. 6, process 600 may include storing and/or executing the reduced data structure (block 640). For example, client device 210 may store and/or execute the reduced data structure. In some implementations, client device 210 may provide, for display, the reduced data structure and/or a graphical representation of the original data structure and/or the reduced data structure (e.g., as in FIGS. 4B, 4D, 4F, 4H, and 4I).

In some implementations, client device 210 may store the reduced data structure. For example, client device 210 may not execute the reduced data structure until client device 210 receives a request for an output value associated with the reduced data structure. In this way, client device 210 reduces read-write operations with regard to tall variables, and conserves processor resources that would otherwise be used to execute the reduced data structure immediately. Furthermore, client device 210 improves user experience by deferring execution of the reduced data structure. For example, some processing operations may take minutes, hours, or days to execute. By deferring execution of the processing operations until a value related to the processing operations is requested, client device 210 reduces interruption of the computer programming process.

In some implementations, client device 210 may execute the reduced data structure. For example, based on receiving a request for an output value associated with the reduced data structure, client device 210 may execute a portion of the reduced data structure. In some implementations, client device 210 may execute part of the reduced data structure. For example, referring to FIGS. 4H and 4I, assume that client device 210 receives a request to obtain a value of r1. In that case, client device 210 may identify operations to be performed to determine the value of r1, and may perform the identified operations without performing other operations identified by the reduced data structure. In this way, client device 210 conserves processor resources, reduces read-write operations, and saves time associated with processing a tall variable. For a more detailed description of deferred execution, refer to FIG. 7, below.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for processing big data based on a reduced data structure. In some implementations, one or more process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include determining that an output value is to be determined based on performing a set of operations with regard to a tall variable (block 710). For example, client device 210 (e.g., TCE 220) may receive an instruction or a request to determine an output value of a set of operations. The set of operations may include one or more big data primitives and/or one or more non-tall operations (e.g., an aggregation operation, a cache operation, a reduction operation, a re-partition operation, a union operation, a filter operation, an operation based on a key, or the like). The set of operations may relate to a tall variable. For example, client device 210 may perform part of, or all of, the set of operations to determine the output value based on the tall variable.

In some implementations, client device 210 may receive an instruction or a request to obtain a value of the output value. For example, client device 210 may receive a request for the output value, and may determine that the output value is to be determined based on the request instruction. In some implementations, the output value may be an intermediate value, and may be used as an input for one or more operations to be performed on the tall variable. As another example, client device 210 may receive an instruction to execute the set of operations, and may determine that the output value is to be determined based on executing the set of operations.

As further shown in FIG. 7, process 700 may include obtaining a reduced data structure corresponding to the set of operations (block 720). For example, client device 210 (e.g., TCE 220) may obtain a reduced data structure corresponding to the set of operations. In some implementations, client device 210 may generate the reduced data structure, as described in more detail in connection with FIGS. 4A-4I and 6, above. In some implementations, client device 210 may obtain the reduced data structure from another device. For example, server device 230 may store the reduced data structure in association with the tall variable and/or a partitioned array associated with the tall variable. As another example, server device 230 may generate the reduced data structure, and may provide the reduced data structure to client device 210.

In some implementations, client device 210 may generate the reduced data structure based on determining that an output value is to be provided. For example, based on receiving an instruction to perform a gather operation relating to a tall variable, client device 210 may obtain an original data structure corresponding to the tall variable. Client device 210 may determine a reduced data structure based on the original data structure, as described in more detail in connection with FIG. 6, above. In this way, client device 210 may determine a reduced data structure based on receiving a gather instruction, which may conserve processor resources that would otherwise be used to determine the reduced data structure when program code associated with the reduced data structure is received.

As further shown in FIG. 7, process 700 may include identifying one or more particular operations, of the set of operations, to perform on a data set associated with the tall variable to determine the output value (block 730). For example, client device 210 (e.g., TCE 220) may identify one or more particular operations to perform to determine the output value. The one or more particular operations may include a subset of, or all of, the operations included in the set of operations. For example, if the output value is a final output of the set of operations, the one or more particular operations may include all operations in the set of operations. If the output value is an intermediate value, the one or more particular operations may include a subset of the set of operations. As another example, if the output value is one of a set of output values, the one or more particular operations may not include operations corresponding to one or more other values of the set of output values.

Client device 210 may identify the one or more particular operations based on the reduced data structure. For example, assume that a reduced data structure includes a first branch corresponding to operations to determine a first output value, and assume that the reduced data structure includes a second branch corresponding to operations to determine a second output value. Assume that the reduced data structure includes a reduction operation to combine the first output value and the second output value to generate a third output value. When client device 210 is to determine the first output value, client device 210 may perform the operations of the first branch. When client device 210 is to determine the second output value, client device 210 may perform the operations of the second branch. When client device 210 is to determine the third output value, client device 210 may perform the operations of the first branch and the second branch. In this way, client device 210 conserves read operations, write operations, and/or processor resources that would otherwise be used to execute an entirety of the reduced data structure to determine a particular output value.

As further shown in FIG. 7, process 700 may include performing the one or more particular operations to determine the output value (block 740). For example, client device 210 (e.g., TCE 220) may perform the one or more particular operations to determine the output value. In some implementations, client device 210 may cause another device to perform the one or more particular operations. For example, in a situation where server device 230 stores the tall variable, or stores a partition of the tall variable, client device 210 may cause a context associated with server device 230 to perform the one or more particular operations on the tall variable or the partition. Similarly, when multiple server devices 230 store two or more different portions of the tall variable, client device 210 may cause the multiple server devices 230 to perform the one or more particular operations on the respective portions. In some implementations, client device 210 may cause the one or more particular operations to be performed based on an interface with a particular big data backend environment (e.g., a parallel pool backend environment, a MapReduce model or backend environment, an Apache Spark backend environment, etc.).

In some implementations, client device 210 may perform the one or more particular operations. In such a case, client device 210 may obtain portions of the tall variable that can fit in local memory of client device 210, and may perform the one or more particular operations with regard to the portions of the tall variable (e.g., sequentially, in parallel, etc.).

In some implementations, client device 210 may determine a size, in the tall dimension, of a tall variable to perform the one or more particular operations. For example, client device 210 may selectively perform the one or more particular operations locally, or may cause another device to perform the one or more particular operations, based on the size of the tall variable. When client device 210 determines that a data set associated with the tall variable will not fit in local memory, client device 210 may cause one or more other devices to determine the output value, which improves efficiency and speed of determining the output value. When client device 210 determines that a data set associated with the tall variable will fit in local memory, client device 210 may obtain the data set and determine the output value, which conserves processor resources of one or more devices that store the data set.

In some implementations, after determining a size of a tall variable, client device 210 may provide information identifying the size of the tall variable. For example, before determining the size of the tall variable, client device 210 may provide (e.g., for display) information indicating that the size of the tall variable is unidentified to client device 210. Based on determining the size of the tall variable (e.g., by counting a quantity of index values in a tall dimension of the tall variable, by performing an operation with regard to each element or slice of the tall variable, etc.), client device 210 may provide (e.g., for display) information identifying the size of the tall variable.

As further shown in FIG. 7, process 700 may include providing the output value (block 750). For example, client device 210 may provide and/or store the output value. In some implementations, client device 210 may provide the output value for display (e.g., via a display of client device 210 or another device). In some implementations, client device 210 may provide the output value for storage (e.g., by server device 230, etc.). In some implementations, client device 210 may provide information relating to the output value for display (e.g., information identifying a size, in a tall dimension, of a data set associated with the output value, operations performed to determine the output value, a graphical representation of the output value, etc.).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, a device reduces a quantity of read-write operations and reduces an amount of time required to perform operations on big data. Furthermore, by using partitioned arrays and big data primitives, the device permits a user to input operations that can function across different big data formats and/or locations, thus conserving computer resources and reducing waste associated with configuring different programs for different big data batches.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code, input code, output code, etc.) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive program code that identifies a plurality of operations to be performed with regard to big data;
   identify a plurality of read operations corresponding to the plurality of operations,
      the plurality of read operations being performed to obtain respective inputs of the plurality of operations;
   generate a first data structure that identifies the plurality of operations and the plurality of read operations;
   identify two or more operations, of the plurality of operations, that receive a particular input;
   generate a second data structure that includes a combined operation,
      the combined operation being generated based on the two or more operations,
      the plurality of read operations being with regard to a tall variable,
      the tall variable being associated with a data set that will not fit in a local memory of one device and that has a length in at least one dimension of the data set that is unidentified to the device until the device performs an operation on the tall variable, and
      the combined operation being associated with fewer read operations, with regards to the tall variable, than the plurality of read operations identified by the first data structure; and
   determine one or more output values based on the second data structure.

2. The device of claim 1,
   where the plurality of operations is a first plurality of operations;
   where the second data structure identifies a second plurality of operations that includes the combined operation; and
   where the one or more processors, when determining the one or more output values, are to:
      receive a request identifying a particular output value of the one or more output values;
      identify one or more particular operations, of the second plurality of operations, that are to be performed to determine the particular output value; and
      determine the particular output value based on performing the one or more particular operations.

3. The device of claim 2, where the one or more processors, when determining the one or more output values, are to:
   determine that a given operation, of the one or more particular operations, can be performed in parallel for two or more different portions of the data set; and
   cause the given operation to be performed in parallel for the two or more different portions to determine the one or more output values.

4. The device of claim 1,
   where the combined operation is a first combined operation of a plurality of combined operations associated with the second data structure; and
   where the one or more processors, when generating the second data structure, are to:
      generate the second data structure to include a second combined operation,
         the second combined operation being generated based on particular operations of the plurality of operations,
            each particular operation, of the particular operations, receiving, as an input, an output of the first combined operation.

5. The device of claim 1, where the data set is identified by a variable,
   the variable identifying one or more storage locations associated with the data set, and
   the second data structure being stored in association with the variable.

6. The device of claim 5,
   where the data set includes an array,
      a particular dimension of the array being associated with an unidentified quantity of values; and
   where the variable identifies the particular dimension.

7. The device of claim 6,
   where the device is a first device;
   where respective portions of the array are stored by at least two second devices,
      each second device, of the at least two second devices, storing a different portion of the respective portions; and
   where the one or more processors, when determining the one or more output values, are to:

cause each second device, of the at least two second devices, to perform the plurality of operations, with regard to the respective portion stored by each second device, to determine the one or more output values.

8. The device of claim 1,
where the combined operation is to receive, as input, each element of the data set; and
where the combined operation is to generate an array of a predetermined size based on the data set.

9. A non-transitory computer-readable medium storing instructions, the instructions comprising:
one or more instructions that, when executed by one or more processors, cause the one or more processors to:
receive program code that identifies a plurality of operations;
identify a plurality of read operations corresponding to the plurality of operations,
the plurality of read operations being performed to obtain respective inputs of the plurality of operations;
combine two or more operations, of the plurality of operations, to form a combined operation,
the two or more operations being combined based on the two or more operations receiving a particular input,
the plurality of read operations being with regard to a tall variable,
the tall variable being associated with a data set that will not fit in a local memory of one device and that has a length in at least one dimension of the data set that is unidentified to a device until the device performs an operation on the tall variable, and
the combined operation being associated with fewer read operations, with regards to the tall variable, than the plurality of read operations;
determine one or more output values based on the combined operation; and
output the one or more output values.

10. The non-transitory computer-readable medium of claim 9,
where the one or more instructions, when executed by the one or more processors, cause the one or more processors to:
identify two or more partitions of the data set,
each partition, of the two or more partitions, to be processed by a different device of a plurality of devices; and
where the one or more instructions, that cause the one or more processors to determine the one or more output values, cause the one or more processors to:
cause the plurality of devices to process respective partitions, of the two or more partitions, based on the combined operation, to determine the one or more output values.

11. The non-transitory computer-readable medium of claim 9,
where the one or more instructions, when executed by the one or more processors, cause the one or more processors to:
determine a quantity of values in a particular dimension of the data set; and
provide information identifying the quantity of values.

12. The non-transitory computer-readable medium of claim 11, where the one or more instructions, that cause the one or more processors to determine the quantity of values, cause the one or more processors to:
determine the quantity of values based on performing the combined operation with regard to the data set.

13. The non-transitory computer-readable medium of claim 9, where the one or more instructions, that cause the one or more processors to determine the one or more output values, cause the one or more processors to:
receive a request for a particular output value of the one or more output values;
identify one or more particular operations, of the plurality of operations and the combined operation, that are to be performed to determine the particular output value; and
cause the one or more particular operations to be performed to determine the particular output value.

14. The non-transitory computer-readable medium of claim 9,
where the plurality of operations is a plurality of first operations;
where the one or more instructions, when executed by the one or more processors, cause the one or more processors to:
generate a first data structure based on a plurality of closures corresponding to the plurality of first operations,
the plurality of closures identifying the respective inputs of the plurality of first operations and respective outputs of the plurality of first operations; and
where the one or more instructions, that cause the one or more processors to combine the two or more operations, cause the one or more processors to:
identify the two or more operations based on the first data structure; and
generate a second data structure,
the second data structure identifying the combined operation and one or more second operations,
the combined operation and the one or more second operations being used to determine the one or more output values.

15. A method, comprising:
receiving program code that identifies a plurality of first operations,
the receiving being performed by one or more devices;
generating a first data structure identifying respective inputs of the plurality of first operations and respective outputs of the plurality of first operations,
the generating being performed by the one or more devices;
combining two or more first operations, of the plurality of first operations, to form a combined operation,
the two or more first operations being combined based on the two or more first operations receiving a particular input,
the combining being performed by the one or more devices,
the plurality of first operations being with regard to a tall variable,
the tall variable being associated with a data set that will not fit in a local memory of one device and that has a length in at least one dimension of the data set that is unidentified to a device until the device performs an operation on the tall variable,
the combined operation being associated with fewer operations, with regards to the tall variable, than the two or more first operations identified by the first data structure, and the combined operation being associated with fewer disk access operations than the two or more first operations;

generating a second data structure identifying a plurality of second operations, the plurality of second operations including the combined operation, the plurality of second operations, when performed, generating one or more output values, and the generating being performed by the one or more devices; and determining the one or more output values based on the plurality of second operations, the determining being performed by the one or more devices.

16. The method of claim 15, where the respective inputs of the plurality of first operations are obtained based on a respective plurality of first read operations; and where respective inputs of the plurality of second operations are obtained based on a plurality of second read operations, the plurality of second read operations including fewer read operations than the plurality of first read operations.

17. The method of claim 15, where determining the one or more output values comprises:

receiving a request for a particular output value of the one or more output values;

identifying one or more second operations, of the plurality of second operations, to be performed to determine the particular output value, the one or more second operations being identified based on the second data structure; and determining the particular output value based on performing the one or more second operations.

18. The method of claim 17, where generating the second data structure comprises:

generating the second data structure based on receiving the request for the particular output value.

19. The method of claim 15, where the one or more devices include a plurality of devices;

where the data set includes an array that includes two or more partitions, each partition, of the two or more partitions, being stored by a different device of the plurality of devices; and where the method further comprises:

selecting a selected device, of the plurality of devices, to determine the one or more output values; and causing each partition, of the two or more partitions, to be provided to the selected device.

20. The method of claim 15, where determining the one or more output values comprises:

generating, based on the second data structure, a plurality of processing modules corresponding to the plurality of second operations, each processing module, of the plurality of processing modules, performing a different operation, of the plurality of second operations; and causing the data set to be provided to at least one processing module of the plurality of processing modules, the plurality of processing modules performing the plurality of second operations to generate the one or more output values.

* * * * *